United States Patent
Horn

(10) Patent No.: US 10,280,681 B2
(45) Date of Patent: May 7, 2019

(54) WINDOW COMPRISING A MODULAR DRUM VALVE

(71) Applicant: ClimaWin Techniq ApS, Lunderskov (DK)

(72) Inventor: Poul Christensen Horn, Lunderskov (DK)

(73) Assignee: CLIMAWIN TECHNIQ APS, Lunderskov (DK)

( * ) Notice: Subject to any disclaimer, the term of this patent is extended or adjusted under 35 U.S.C. 154(b) by 144 days.

(21) Appl. No.: 14/766,572

(22) PCT Filed: Feb. 7, 2014

(86) PCT No.: PCT/DK2014/050032
§ 371 (c)(1),
(2) Date: Aug. 7, 2015

(87) PCT Pub. No.: WO2014/121801
PCT Pub. Date: Aug. 14, 2014

(65) Prior Publication Data
US 2015/0368961 A1 Dec. 24, 2015

(30) Foreign Application Priority Data
Feb. 8, 2013 (DK) .................. 2013 70066

(51) Int. Cl.
*E06B 7/10* (2006.01)
*E06B 7/12* (2006.01)
(Continued)

(52) U.S. Cl.
CPC .................. *E06B 7/10* (2013.01); *E06B 7/12* (2013.01); *E06B 9/264* (2013.01); *F24F 11/30* (2018.01);
(Continued)

(58) Field of Classification Search
CPC ........ F16K 5/04; F16K 5/0407; F16K 5/0442; F16K 11/02; F16K 13/02; F16K 31/041; F24F 13/1486
See application file for complete search history.

(56) References Cited

U.S. PATENT DOCUMENTS 4,369,766 A * 1/1983 Coley .................... F24J 2/0433
126/572
4,700,614 A * 10/1987 Dudzik .................... E06B 7/06
454/213

(Continued)

FOREIGN PATENT DOCUMENTS

DE 1 659 222 A1 1/1971
DE 1659222 A1 * 1/1971 ........... E06B 3/6715
(Continued)

*Primary Examiner* — Gregory L Huson
*Assistant Examiner* — Elizabeth M. May
(74) *Attorney, Agent, or Firm* — David S. Safran; Roberts Mlotkowski Safran Cole & Calderon, P.C.

(57) ABSTRACT

A ventilation device for ventilating a room in a building, the building having a window with at least two essentially parallel panes of glass, the at least two panes of glass being arranged in a common frame, casement or sash, thus forming the window, e.g., a double window, where the at least two panes of glass are arranged with a distance, and thus appear with an air space between the panes of glass, the window further having an intake opening communicating with the air space and with either the interior or the exterior of the building, where the ventilation device further has a preheating unit with a first chassis and a first throttle, where the first chassis has a first opening communicating with the interior of the building, a second opening communicating with the exterior of the building and a third opening communicating with the air space.

14 Claims, 18 Drawing Sheets

(51) Int. Cl.
  *E06B 9/264* (2006.01)
  *F24F 13/18* (2006.01)
  *F24F 13/065* (2006.01)
  *F24F 11/30* (2018.01)
  *E06B 7/02* (2006.01)
  *F24F 11/00* (2018.01)
  *F24F 110/10* (2018.01)
  *F24F 110/20* (2018.01)
  *F24F 110/70* (2018.01)
  *F24F 110/76* (2018.01)

(52) U.S. Cl.
  CPC ............ *F24F 13/065* (2013.01); *F24F 13/18* (2013.01); *E06B 2007/026* (2013.01); *E06B 2009/2643* (2013.01); *F24F 2011/0002* (2013.01); *F24F 2110/10* (2018.01); *F24F 2110/20* (2018.01); *F24F 2110/70* (2018.01); *F24F 2110/76* (2018.01)

(56) References Cited

U.S. PATENT DOCUMENTS 4,730,771 A * 3/1988 Shepherd ................. F24D 5/04
                                                    236/13
8,221,201 B2   7/2012 Christensen et al.

FOREIGN PATENT DOCUMENTS

| DE | 30 43 783 A1 | 6/1982 | |
|----|----|----|----|
| DE | 31 09 811 A1 | 11/1982 | |
| EP | 0 093 364 A2 | 11/1983 | |
| EP | 0 164 111 A2 | 12/1985 | |
| EP | 0164111 A2 * | 12/1985 | ............ F24F 5/0075 |
| JP | 2003-185186 A | 7/2003 | |
| JP | 2003185186 A * | 7/2003 | ................ F24F 5/00 |

* cited by examiner

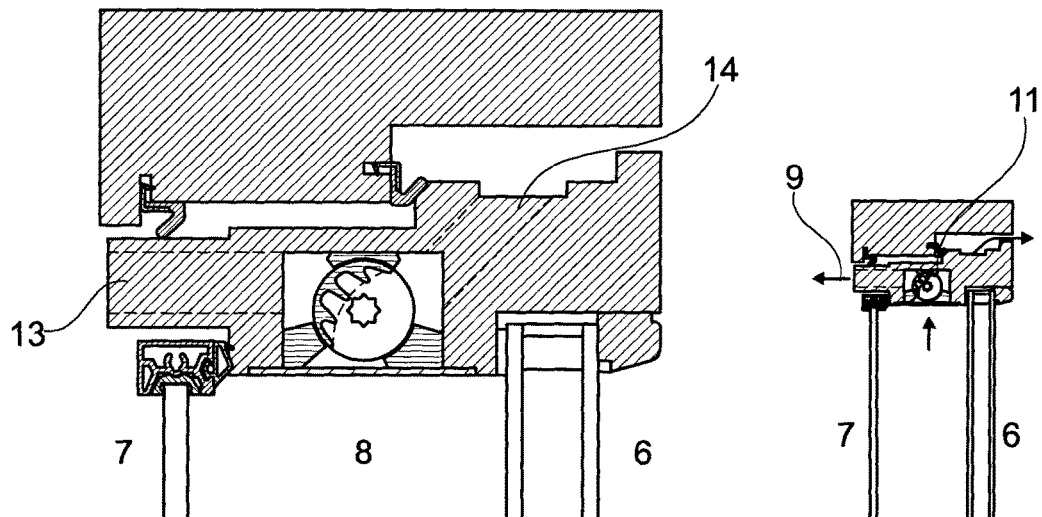
Fig. 15
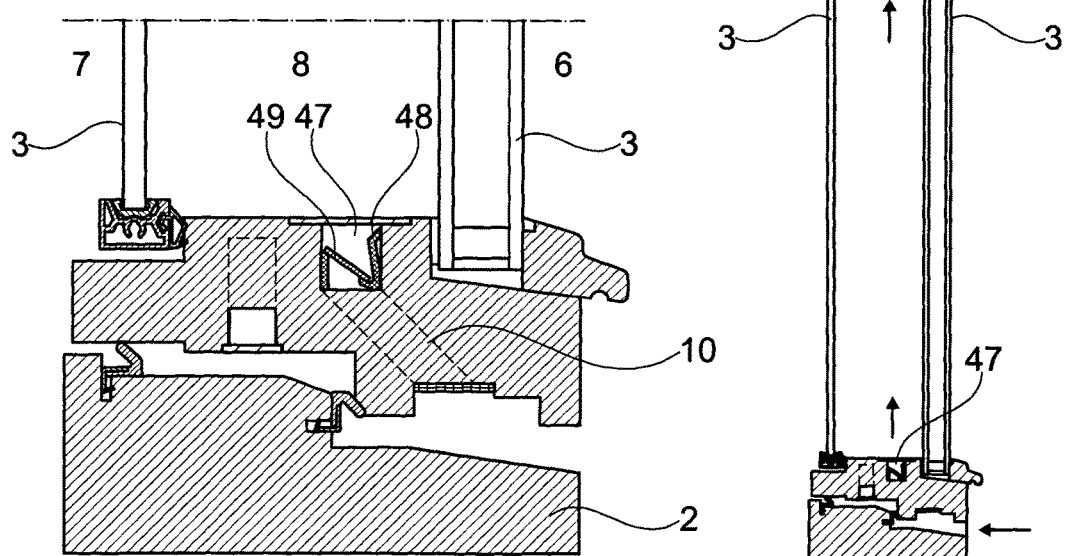
Fig. 16
Fig. 14

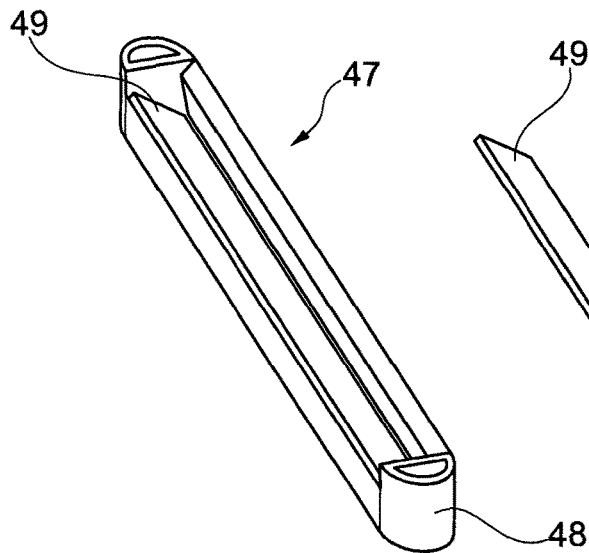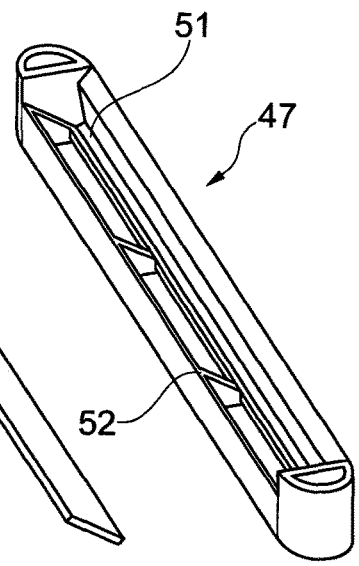
Fig. 17a        Fig. 17b
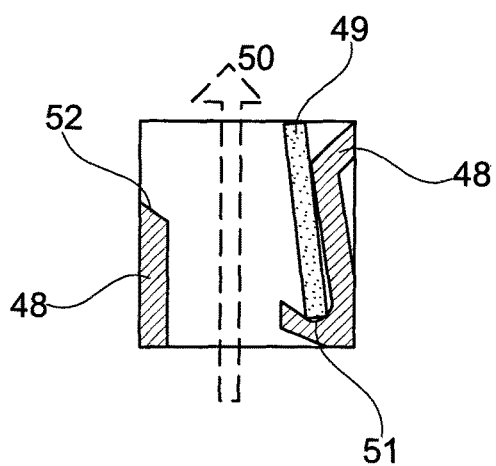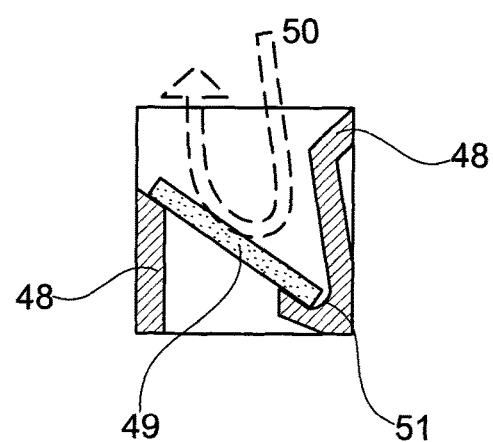
Fig. 18        Fig. 19

WINDOW COMPRISING A MODULAR DRUM VALVE

BACKGROUND OF THE INVENTION

Field of the Invention

The present invention relates to a ventilation device for ventilating a room in a building, said building comprising a window, said window comprising at least two essentially parallel panes of glass, said at least two panes of glass being arranged in a common frame, casement or sash, hereinafter referred to as a frame, or in two or more juxtaposed and preferably connected frames, thus forming said window, e.g., a double window, where said at least two panes of glass are arranged with a distance, and thus, appear with an air space between said panes of glass, said window further comprising an intake opening communicating with said air space and with either the interior or the exterior of said building, where said ventilation device further comprises a preheating unit, comprising a first chassis and a first throttle, where said first chassis comprises a first opening communicating with the interior of said building, a second opening communicating with the exterior of said building and a third opening communicating with said air space.

Description of Related Art

It is well known to have window constructions that in some manner are arranged together with ventilation systems, that allow air to be circulated from the outside to the inside of a room or building, by guiding the air between two panes of glass and into the inside. This is done to ventilate the room or building with air that is preheated during its flow between the two panes of glass. Over the years it has been common to regulate such a flow by manually opening and closing shutters or sliding doors at the bottom and at the top of a window frame. This is however dependent of that an operator actually operates the mentioned shutters or sliding doors and as it is a manual process, an optimum operation is practically impossible to obtain.

In order to have a more controlled system various complex solutions have been presented. European Patent Application EP 1 809 848 B1 and corresponding U.S. Pat. No. 8,221,201 B2 describes a solution comprising a rather complicated cartridge consisting of no less than four slide throttles, two thermo-hydraulic actuators, and two chambers. This cartridge is suitable for arranging in the top member of a window frame and is controlled solely by said thermo-hydraulic actuators which are connected to said slide throttles. As mentioned before, this is a rather complex solution and the cartridge is quite complicated and thus also expensive. Furthermore there is only one way of controlling this system, namely via said thermo-hydraulic actuators which sense or react according to the temperature at the position of the cartridge—actually inside the cartridge. The system is thus not very reactive and rather large fluctuations in temperature between the panes of glass, outside or inside the building can occur without the system even responding.

From German Patent Application DE 30 43 783 A1 another system is known, that also is rather complex. This system comprises two units—one in the lower and one in the upper window frame. Both of these units may be operated individually and manually between four different positions on each unit. Said units can be mechanically connected by e.g., a chain or belt connection that has to be built into the window frame, thus allowing both units to be operated by one manual control means. Further, the units in this system are constructed with an outer cylindrical tube with a number of holes in the periphery that interact with corresponding holes or bores in a central inner cylindrical regulating member installed inside said tube. By rotating the inner part of the two units, in relation to the outer part, air can be directed into various directions. A solution as this also has the drawback of being rather high and thus demanding a rather high window frame, which will "steal" relatively much of the regular window area, and thus, allow less light to enter the building.

European Patent Application EP 0 164 111 A2 teach a device that is operated based on temperatures, humidity and other factors such as $CO_2$ content in the air. Also, this solution is rather complex as it comprises a motorized ventilator, that is used to force a flow of air between the panes of glass. Further, this solution also teaches to arrange a ventilation device comprising a valve in both the top frame and in the bottom frame of the window, where both devises are operated in common. The valves seem to be either open or closed—operated cyclic between end positions—and not able to be adjusted in a step less manner. Further the passage through the valve is shaped as a narrow mélange and will only allow for a rather large flow when forcing the air to circulate by activating the mentioned ventilator. The solution as described in European Patent Application EP 0 164 111 A2 is claimed to be suitable for installation in special windows and doors, and is indeed not suitable to be arranged in a standard frame, e.g., a wooden frame, as the design and all the needed devices are rather bulky and complex.

As can be understood from the above, these known solutions are somewhat complex, expensive to build and install in window constructions, and they are not very easy to operate and to control in a manner that allows good and efficient use of the ventilating system, which when taken seriously can contribute quite a bit to a better environment in the building and at the same time save cost for heating and/or cooling when used in a proper way. Thus there is still room for improvement and a simpler and more effective solution calls for development.

SUMMARY OF THE INVENTION

It is an object of the invention to provide a modular valve system, comprising one or more valve modules and a regulation/drive module, where said modules are arranged to be interconnected according to the specific purpose, where said modules are suitable for arrangement and installation in a window frame, casement or sash.

As mentioned above, the invention relates to a ventilation device for ventilating a room in a building, said building comprising a window, said window comprising at least two essentially parallel panes of glass, said at least two panes of glass being arranged in a common frame, casement or sash, hereinafter referred to as a frame, or in two or more juxtaposed and preferably connected frames, thus forming said window, e.g., a double window, where said at least two panes of glass are arranged with a distance, and thus appear with an air space between said panes of glass, said window further comprising an intake opening communicating with said air space and with either the interior or the exterior of said building, where said ventilation device further comprises a preheating unit, comprising a first chassis and a first throttle, where said first chassis comprises a first opening communicating with the interior of said building, a second opening communicating with the exterior of said building and a third opening communicating with said air space.

The ventilation device according to the invention comprises at least one modular preheating unit, where said at least one preheating unit is arranged in said frame and where said preheating unit, in said first chassis, comprises a first rotatable throttle, where said first rotatable throttle comprises a central longitudinal rotation axis, said preheating unit further comprises means for operating said first rotatable throttle about said central rotation axis, and where at least one of said first rotatable throttle and/or first chassis comprises connection means for connection with a further modular unit of a ventilation device in a longitudinal direction.

By arranging connection means e.g., at the end of a preheating unit, where said connection means are connectable with corresponding connection means on a further part of the ventilation device, it becomes possible to configure the ventilation device according to specific needs or dimensions of the frame of the actual window. In some situations there may be a larger need for ventilation and in such situations a ventilation device according to the invention may comprise more than one preheating unit as these units simply can be arranged and coupled by said connection means along the central longitudinal axis. A typical length of a preheating unit can be 150 millimeters, it can also be shorter or longer, but 150 millimeters allows for an attractive flexibility.

As the units are modular the outside dimensions of the cross section are the same on all modules and thus the groove in the frame, where the modular units are to be installed can simply be made shorter or longer according to the length and the number of modular units needed. Using modular units makes both production and the ventilation capacity quite a lot more flexible compared to using non-modular ventilation devices.

At the same time, it also makes it possible to obtain a number of possible combinations with only a minimum of different parts in stock, which of course will minimize the costs of the stock and maximize the flexibility.

As the modules all have a central longitudinal axis the rotatable throttle of a preheating unit can in principle be rotated all 360 degrees again and again, which makes it possible to operate the ventilation device by activating the rotatable throttle in only one direction. This allows for using a simpler actuator e.g., an electric motor and simple detecting means that only has to be able to detect rotational movement in one direction. It will of course be possible to use a more complex actuator and sensors that can be used for operating and detecting rotational movement in both directions.

In an embodiment of a ventilation device according to the invention, said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed and an open position, further said second chassis comprises a fourth opening communicating with the interior of said building, and a fifth opening communicating with the exterior of said building. The bypass unit serves as a valve allowing a flow of air from the exterior to the interior or vice versa.

A ventilation device according to the invention further comprises a modular drive unit, where said drive unit is arranged in said frame and where said drive unit comprises a third chassis and means for rotating said first and/or second rotatable throttle about a central longitudinal axis, where said drive unit comprises e.g., one or more electric and/or thermal actuators, said drive unit further comprises or being connected to means for activating said first and/or second throttle, preferably in a countless number of positions, between a closed position and an open position. A ventilation device according to the invention can be installed in only one of the frame, casement, and sash parts, which makes this solution more simple and thus also more user friendly and cost effective. There only need to be an intake opening in e.g., an opposite frame, casement or sash part, where air can be taken in and via the preheating unit distributed to one of the exterior or interior, when the preheating unit is not closed. An intake opening can in a preferred embodiment be arranged to take in air from the exterior and via the air space between two panes of glass said air will be guided either to the exterior or to the interior of a building.

The ventilation device according to the invention is not necessarily arranged in the outer frame, but can be arranged in a part of the casement or sash. As it is a modular system comprising a number of modules with the same size of their cross sections all relevant parts can be installed in a suitable groove in a window part. There is no need for special adapted parts, but a relatively simple groove in a wooden frame will suit just perfect for installation of the modular units. The drive unit will, in a preferred embodiment, be operable in a stepless/countless manner in order to be able to adjust the throttles of the device in a very specific manner.

In a preferred embodiment of the ventilation device, said drive unit comprises a first drive subunit connected to said first rotatable throttle and for rotating said first rotatable throttle about a central longitudinal axis and a second drive subunit connected to said first rotatable throttle and for rotating second rotatable throttle about a central longitudinal axis. The drive unit may thus be one single unit comprising two subunits, i.e., a preheating subunit and a bypass subunit, or the drive unit may comprise the preheating subunit and/or a bypass subunit as separate units.

When the drive unit contains two separate drive units it is possible to control the position of the preheating unit and the bypass unit independently from each other. This ability results in that the position of the preheating throttle can be adjusted in various positions independently of the position of the bypass throttle and vice versa. Hereby, it becomes possible to adjust preheating of the air intake or the cooling effect according the actual need as well as it is possible adjusting the fresh air intake via the bypass unit.

Preferably, the first and/or second drive subunits are actuated by one or more thermal actuators, such as a thermal actuator for each subunit. When the preheating subunit and/or the bypass subunit comprise a thermal actuator, it becomes possible to adjust the position of the throttles in the preheating unit and/or the bypass unit simply by rotating a throttle via a drive connected to the thermal actuator. The thermal actuator responds to changes in the temperature in a certain area, and thus, actuates according to the relevant temperature in that area.

The thermal actuator is filled with a substance, e.g., wax, which responds to increasing temperature changes by expanding its volume, and vice versa for decreasing temperatures, whereby the actuator can cause a movement of the drum valve in the connected preheating unit or bypass unit, whereby electric connections become superfluous and the position of the throttles in the preheating unit and/or the bypass unit are elegantly controlled by changes in air temperatures as discussed below. In certain situations, it may be necessary to override the automatic control performed by the thermal actuators. This can be performed by arranging a heating coil around the thermal actuators, which is connected to an electrical power source, e.g., a battery or electrical power supply, and a control unit. The heating coil can be activated and the heating supplied to the thermal actuators then activate the throttles of the preheating unit and/or the bypass unit so that the preheating unit and/or the bypass unit is forced to open or close.

Hereby, it becomes possible to include manual control of the otherwise automatically controlled ventilation system, e.g., when fresh air intake is required in the interior even though the temperature is too low and the bypass unit is closed, or that air intake through the airspace and the preheating unit is to be closed at a lower temperature than performed by the thermal actuator, e.g., in case of a sudden outdoor pollution of air.

In the preheating drive subunit, the thermal actuator is connected to the first rotating throttle of the preheating unit via a shaft rotated by the thermal actuator and gears, which rotates the first rotating throttle in the preheating unit, e.g., through a shaft connection.

In the bypass drive subunit, the thermal actuator pushes a frame having a toothed connection to a cam on a perpendicularly arranged second shaft, which is can be connected the second rotating throttle of the bypass unit. When the thermal actuator pushes to the frame, the toothed connection with the cam provides rotation of the second shaft which then rotates the second rotating throttle in the bypass unit, e.g., through a shaft connection.

It is understood that the preheating control sub unit may also be suitable for controlling the bypass unit. Likewise, the bypass control subunit may be used to control the preheating unit.

The ventilation system is installed in the window frame, casing or sash, and preferably in the top of the window casing.

The preheating unit chassis has openings in 3 directions, i.e., towards the interior, towards the exterior, and towards the air space in the cavity between two glazed frames. The air space is connected to open air through an intake slot in the bottom member of the casing. The orientation of the first throttle, also called drum valve, in the preheating unit will be controlled by the preheating sub drive unit, and depends on air temperature in the air space. The thermal actuator of the preheating drive subunit is arranged so that it detects temperature in the air space cavity, and governs the valve in relation to the temperature in the air. At air space temperatures below a certain first and low temperature limit, e.g., 10-15° C., or preferably 11-13° C. the preheating unit will remain closed.

As air temperature in the air space rises above this first lower temperature, the first throttle in the preheating unit will be gradually rotated to establish a connection between the air space and interior side. Energy contribution from the sun and/or the interior side may heat the air in the cavity, and by natural convection the valve will direct pre-heated ventilation air from the intake slot, through the air space and to the interior side, i.e., into the room. When the temperature reaches a second level, e.g., 18-28° C., preferably 21-25° C. the preheating unit is fully open and provides fresh heated air from the exterior side, via the air cavity and to the interior side.

When air temperature in the cavity rises even further, the first throttle in the preheating unit will be rotated even further, which gradually connects the cavity and the outside open air. At the same time the connection from the cavity to the room inside is gradually blocked. When the temperature in the air space reaches a third and high level, such as 20-35° C., or preferably 23-26° C., the interior side is closed and the pre-heated air is now expelled to the exterior providing a self-cooling effect in the window.

The bypass unit chassis is provided with slot access in two directions, towards the interior and towards the exterior. The bypass unit is operated in the following way.

The thermal actuator of the bypass drive subunit will sense exterior temperature, i.e., outside air temperature, and govern the bypass valve accordingly.

At exterior air temperature below a fourth level, such as 10-17° C., preferably 14-16° C. the bypass unit remains closed. When the temperature rises above this level, the throttle of the bypass unit is gradually opened. When the temperature reaches the level, where the throttle of the preheating unit closes, such as 25-35° C., or preferably 28-32° C., the throttle of the bypass unit is in its fully open position. In this position, air can flow freely to and from the room.

The reverse procedure occurs, when the temperatures are lowered.

Thus, the ventilation system can be adjusted in either heating mode, cooling mode or bypass mode when one or more preheating units and/or one or more bypass units are combined with the appropriate drive unit/drive subunits. Often, one or more preheating units and one or more bypass units will be installed in combination to guarantee supply of fresh air even in warm weather. As the air space air temperature rises above 23-26° C., a preheating unit no longer provides fresh air—it changes to cooling mode and expels the warm, fresh cavity air. In this event, the bypass unit installed in the same window will now be open for direct exchange of air.

Preferably, said modular units comprise axial connection means for connection of one modular unit to another modular unit by a connecting shaft. Thus, the preheating unit and the bypass unit can be connected to its appropriate drive subunit by means of a shaft, such as a square rod, a hexagonal rod or a shaft having a star-shaped cross section, i.e., TORX® six pointed star-shaped screw head pattern. Also, a single drive unit or subunit can control multiple preheating and/or bypass units installed end to end in series, where the units are connected to each other by connecting shaft as well. Preferably, the preheating units are grouped on one side of the drive unit so they are controlled by one shaft connection. If present, the bypass units are grouped on the other side of the drive unit so they are controlled by another shaft connection, e.g., so that the two groups are connected to a drive subunit each. This also allows for adjusting distance between the drive unit/subunit and the preheating unit or the bypass unit, simply by arranging a shaft having the desired length between the respective units.

In a preferred embodiment of a ventilation device according to the invention, said modular units comprise connection means for connection of one modular unit to another modular unit, where said connection means comprises one or more snap action mechanisms, where said one or more snap action mechanisms are arranged on the first, second and/or third chassis, on the first and/or second throttles or on both of the first, second and/or third chassis and on the first and/or second throttle. By such snap action mechanisms, it is possible to connect one unit to another unit at two opposing ends. It is thus possible to build a modular ventilation device comprising any possible combination of preheating units, bypass units and drive units in order to fulfill the specific demands for a building or window.

As a snap action mechanism is understood, a locking mechanism with at least one stable position, where the mechanism when applying a force will deform and snap into a locked position, where no external energy is needed to stay in the locked position. Such a type of coupling is also known as a snap-action coupling or a click-fit coupling as known from a number of elements e.g., from parts made from plastic and intended to be installed coupled in a detachable manner to another part. Such a snap action mechanism can with advantage be arranged at the chassis of the units and will thus also hold the connection means of the throttles and the drive means in position. It is however also possible to situate the snap action mechanisms at the connection means or on both of the chassis and connection means, and the same function will be achieved.

In one embodiment of a ventilation device according to the invention, said first rotatable throttle in said preheating unit is a hollow throttle member comprising at least one first throttle opening for communication with the first and the third chassis opening, said first throttle opening having a first area, where said hollow throttle member further comprises a second throttle opening for communication with the second and the third chassis opening, said second throttle opening having a second area. In this situation the term throttle opening is to be understood as one or more openings, as one opening in principle can comprise e.g., a part dividing said opening and serving as a structural and/or bearing part. This will be discussed and explained further in the detailed description and in the figures.

In a ventilation device according to the invention, said preheating unit comprises a first intermediate area between the first and second chassis opening, a second intermediate area between the second and third chassis opening, and a third intermediate area between the third and first throttle opening, where said intermediate areas serve partly as a bearing surface for the rotatable first throttle and partly as a blocking surface for the first and second throttle openings. By designing the extend of said intermediate areas in relation to the extent of the above mentioned throttle openings, the preheating unit can be constructed having a certain specific characteristic, which makes it more easy to control the amount of air directed in the various directions. The extension of the intermediate areas is actually the opposite of the area of the openings in the preheating unit and together the openings and the intermediate areas form a full 360 degrees around the first rotatable throttle.

In a one embodiment of the invention, the second and third intermediate areas serve as a combined bearing and blocking surface for the first and second throttle opening and the first intermediate area serve only as a bearing surface.

In yet another embodiment of a ventilation device according to the invention, said preheating unit comprises a longitudinal edge of at least one of the first chassis opening and/or the first throttle opening, where said longitudinal edge is notlinear e.g., serrated, toothed or helix shaped. This allows for a very small opening, and thus, the possibility to adjust the flow of air through the preheating unit in a very precise manner during opening and/or closing of the preheating unit. In other words said longitudinal edge being non-linear allows the characteristic of the valve—preheating unit—to be designed to specific needs or simply to allow for only a very small flow of air during the first/last degrees of rotational movement from or closed to open or vice versa.

It is, however, of course, possible to design said longitudinal edge to be linear and parallel to the corresponding edge of the counterpart i.e., the first chassis opening and/or the first throttle opening. Further, it is also possible to design both of the longitudinal edges of the first chassis opening and of the first throttle opening in a non-linear manner.

In a ventilation device according to the invention, said rotatable throttle in said bypass unit comprises a throttle plate of the butterfly type, and said bypass unit comprises a fourth opening communicating with the interior and a fifth opening communicating with the exterior of said building. The second throttle—the bypass throttle—of the ventilation device can as mentioned be constructed as a butterfly valve, having a throttle plate arranged in the longitudinal direction of the bypass unit, where said throttle plate is rotated about a central axis coincident with the axis of the first rotatable throttle in the preheating unit. The second throttle in the bypass unit can be constructed as a plate comprising a number of full circle parts dividing the throttle plate into sections. This serves two purposes, namely to prevent air from flowing in a longitudinal direction of the bypass unit and also as a bearing that is resting against a corresponding surface in the second chassis i.e., in the bypass unit.

In a ventilation device according to the invention, said preheating unit and/or bypass unit each comprising a rotatable throttle, further comprises a sealing material arranged between a throttle and a seat/bearing area inside said first and/or second chassis. Such a sealing material can be arranged on the throttle, but can also be arranged on the inside surface of the chassis, preferably only on one of the parts. As the unit has to function with a suitable low friction, it has been found suitable to use a sealing material that does not offer a full contact area between the throttle and the chassis, but still offers a sufficient sealing. By using a sealing material between the valve body and the casing which comprises a kind of blanket having a carrier layer and fibers extending from said carrier layer a good, sufficient and low frictional sealing is obtained. Said fibers are in contact with the corresponding part of the unit and the fibers deflect in an elastic manner and thus creates an attractive sealing. By using a sealing material it is obtained to prevent the ventilation device from rattling due to wind and from leading false air in either direction.

In another embodiment of a ventilation device according to the invention, said preheating bypass and drive unit or units comprise an insulating jacket, e.g., a polystyrene or polyurethane jacket, for one or more individual units. Such an insulation jacket can be molded around each unit and comprise some kind of connecting means at the abutting ends, but in a preferred manner it can also be molded around already connected units or it can be a cover or shell that is arranged around one or more units, said cover or shell having an aperture for the units.

A ventilation device according to the invention may comprise control means for controlling and operating said drive unit, where said control means comprises at least one sensor e.g., a temperature sensor, a humidity sensor, a $CO_2$ sensor and/or an $O_2$ sensor. This will allow the ventilation device i.e., the drive unit to operate the preheating and the bypass unit or units as a function of temperature, humidity, $CO_2$ content, $O_2$ content or other parameters or combinations of such parameters. Input from one or more sensors can be computed in a control system and used as input for one or more electrical actuators in the drive unit. Such a control unit can easily be integrated with e.g., sun shading of one or more windows and can be controlled via various parameters. A ventilation device can e.g., also comprise photovoltaic elements for power supply to the drive unit and for other electrical features in said device, e.g., for charging a battery arranged for providing electrical energy to the drive units or a heating coil as discussed below. A photovoltaic cell can be arranged at any suitable position, e.g., in the window pane, in the window frame, casement or sash, as a separate element, or it can be integrated in e.g., a curtain or blinds arranged in the window, e.g., between the interior and the exterior window panes.

A curtain, e.g., a roller curtain/roller blind, or venetian blinds can be arranged in the air space between the window panes. Such blinds or curtains prevent excessive heating due to the sun shining through the window and prevents loss of heat, e.g., during the night. In addition, it separates the air space into two parallel air channels, in which the air is heated differently, because the air space channel adjacent to the exterior window pane is mainly heated by the sun and the airspace adjacent to the interior window pane is mainly heated from the interior side. Hereby, it becomes possible to provide an even more sophisticated heating and/or cooling control, e.g., by arranging one or more thermo sensors, or one or more thermal actuators controlling the preheating drive subunit in one or both parallel air space channels.

In the description of the drawings, an example of how a preheating and/or a bypass unit can be constructed will be seen and discussed and this description will support and explain the description of the above-mentioned embodiments in details.

The invention further comprises a window for a building comprising a ventilation device according to the above description, where said ventilation device is arranged in a window frame, casement or sash.

A method for operating a ventilation device for ventilating a room in a building, according to the above description, is also disclosed herein where said building comprises a window, said window comprising at least two essentially parallel panes of glass, said at least two panes of glass being arranged in a common frame, casement or sash, hereinafter referred to as a frame, or in two or more juxtaposed and preferably connected frames, thus forming said window, e.g., a double window, where said at least two panes of glass are arranged with a distance, and thus appear with an air space between said panes of glass, said window further comprising an intake opening communicating with said air space and with either the interior or the exterior of said building, where said ventilation device further comprises a drive unit.

The method mentioned above comprises at least the steps of:
 detecting and computing input from at least one sensor, said input being based on actual conditions outside or inside said building or in said window or device,
 determining by control means, based on said input, whether air should be lead from the outside, through the air space and to the inside of the building,
 determining by control means, based on said input, whether air should be lead from the outside, through the air space and back to the outside of the building,
 determining by control means, based on said input, whether air should be lead from the outside and directly to the inside of the building or vice versa,
 operating one or more throttles according to said input and determination.

By a method as described, it is possible to control the ventilation device in a manner that ventilates according to the specific conditions and according to individual demands and adjustments. The regulation or control can be done fully automatically in a simple and efficient manner, or it can be done by manual input via some kind of suitable input device e.g., an input device installed in connection with one or more of the above-mentioned sensors. A temperature sensor could for instance comprise a dial or other input means for adjusting and controlling said ventilation device.

A further step of the above mentioned method can be to detect and compute input from at least one sensor, said input being based on actual conditions outside or inside said building or in said window or device, where said input is determined by control means, where it is determined, based on said input, whether air should be lead from the inside, through the air space and back to the inside of the building, and after having performed said determination, operating one or more throttles according to said input and determination.

An embodiment of the invention will now be described, by way of example only, with reference to the accompanying drawings:

BRIEF DESCRIPTION OF THE DRAWINGS

FIG. 14 shows a cross section of the double window with an alternative preheating unit.

FIG. 15 shows a cross section of an alternative construction of the preheating unit.

FIG. 16 shows a cross section of the lower part of the double window with a check valve.

FIG. 17a-b shows the check valve of the lower part of the double window.

FIG. 18 shows a cross section of the check valve in its open position.

FIG. 19 shows a cross section of the check valve in its closed position.

DETAILED DESCRIPTION OF THE INVENTION

In the following text, the figures will be described one by one, and the different parts and positions seen in the figures will be numbered with the same numbers in the different figures. Not all parts and positions indicated in a specific figure will necessarily be discussed together with that figure.

Figure 1:
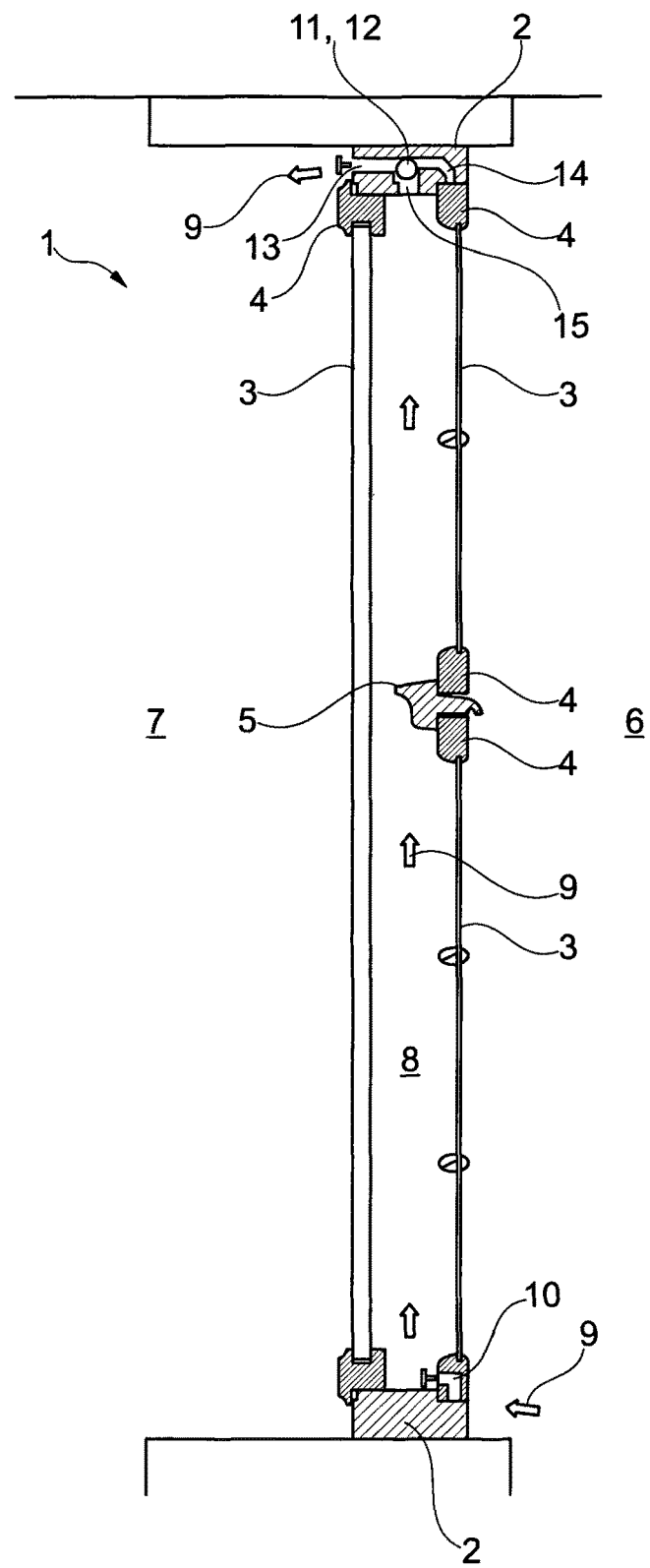
FIG. 1 shows a cross section of a double window comprising a frame and two panes of glass.

In FIG. 1, a cross section of a double window 1 comprising a frame 2 and four panes of glass 3, each installed in a casement or sash 4 is seen—two panes of glass 3 on each side installed in a common frame 2 and parted by a transom 5. One side of the window 1 is the exterior side 6 and the other is the interior side 7.

In FIG. 1, ambient air/airflow—illustrated by arrows 9—is guided from the exterior 6 through an intake 10 in the bottom frame 2 and upwards in an air space 8 between the panes of glass 3 and via a preheating unit 11 in the top frame 2; said air 9 is guided to the interior 7. As can be seen in this figure, the top frame 2 and also the preheating chassis 12 comprises three openings 13, 14, 15, the first opening 13 towards the interior 7, the second opening 14 towards the exterior 6 and the third opening 15 towards the air space 8 between the panes of glass 3. By operating the preheating unit 11, air 9 can be directed in any of the two directions 13, 14 and the flow of air 9 can also be blocked.

A similar construction is shown in FIGS. 14-16, in which the air intake 47 in the bottom frame 2 comprises a check valve 47 as shown in FIGS. 17a-17b. The check valve comprises a check valve body 48 and a separate rectangular check valve element 49. One side of the check valve element 49 rests on a rib formed in the check valve body 48 and the parallel side of the check valve element rests on the valve seat 52, when the check valve 47 is closed position. Air entering the airspace from below the check valve element 49 automatically opens the check valve 47 and holds the check valve element in open position (see FIG. 18), while the check valve automatically closes in case the air flow direction is reversed (see FIG. 19). The check valve thus prevents air flowing in the opposite direction in the air space, i.e., from the top towards the bottom of the airspace.

Figure 2:
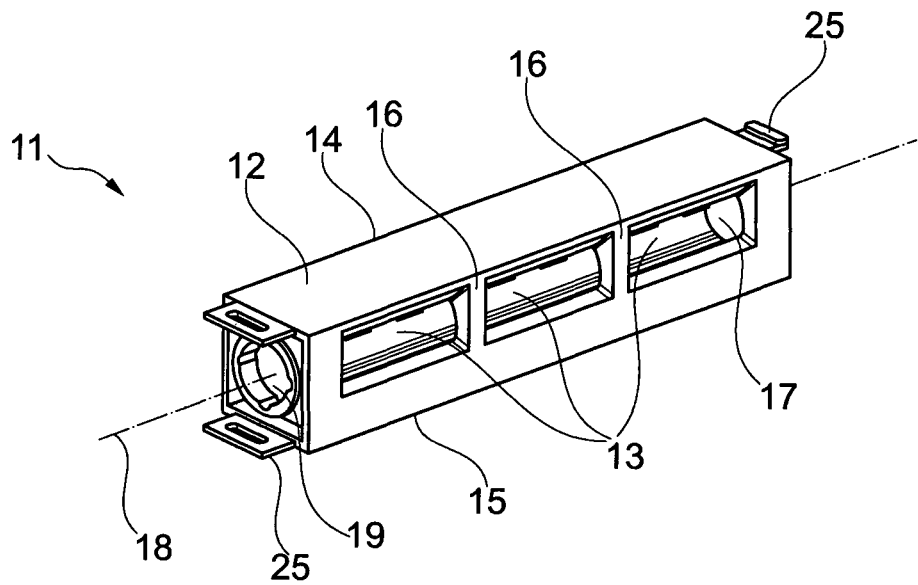
FIG. 2 shows a preheating unit.

FIG. 2 shows a preheating unit 11 comprising a first chassis 12, where a first chassis opening 13 is seen and where a second and a third chassis 14, 15 opening is arranged at the side facing opposite the first opening 13 and the side facing down. The first chassis opening 13 is here seen comprising two dividing struts 16. Such struts 16 can be used to stiffen the first opening 13 as well as the second 14 and third opening 15. Inside the first chassis 12 a first rotatable throttle/preheating throttle 17 is seen, which is rotatable about a longitudinal rotation axis 18. At the displayed end of the first throttle 12, there is arranged means 19 for operating the first throttle 12. In this case, the means 19 comprises an indentation with cut-outs on the side walls making "edges" in the indentation that can engage with corresponding parts on another throttle 12 or on a drive unit.

Figure 3:
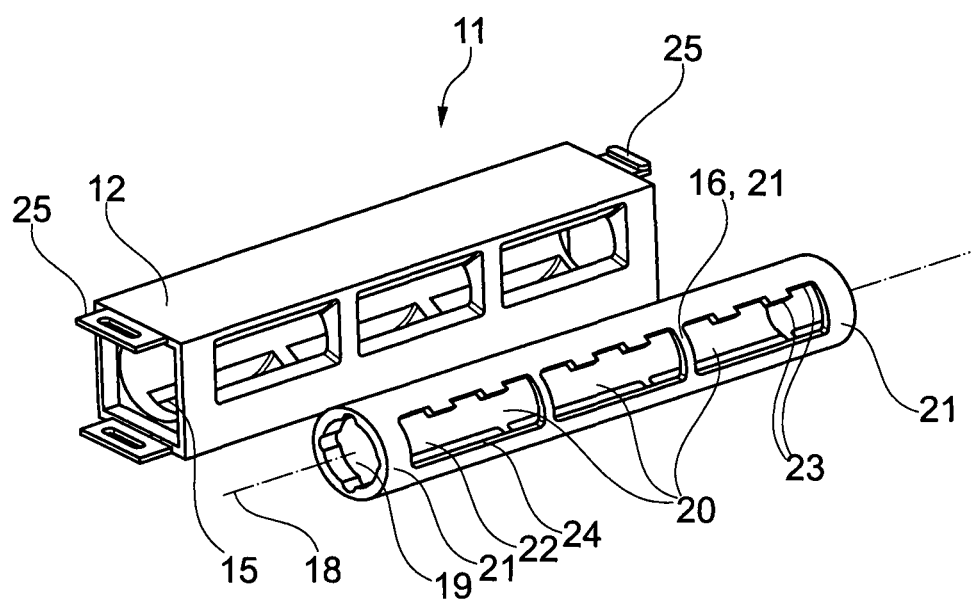
FIG. 3 shows a preheating unit and a not installed first throttle.

In FIG. 3, a preheating unit 11 is seen with a first chassis 12 and an uninstalled first throttle 17. In this figure, the first throttle 17 is seen in more detail. The first throttle opening 20 is seen comprising dividing struts 16, which will act as bearings 21 supporting the throttle 17 in the chassis 12. Further, it is seen that the first throttle 17 has a hollow interior 22 and that the first opening 20 has a non-linear edge 23 that will allow for only a very little opening during the first couple of degrees motion of the first throttle 17 about the rotation axis 18. In this situation, only 60% of the area will be in use as the edge 23 is serrated with teeth taking up 40% of the length of the first throttle opening. This is only an example of one way of shaping said non-linear edge 23 as the non-linear edge 23 can have various shapes. This will be explained in more detail later. On the side of the first throttle 17 facing down, a second throttle opening 24 is arranged, but not seen in this figure. The second throttle opening 24 can also comprise dividing struts 16.

On the chassis 12, at the ends, connection means in the shape of snap action mechanisms 25 are seen. These mechanisms 25 are provided in order to connect one preheating unit 11 to e.g., another preheating unit 11 or to another kind of unit.

Figure 23:
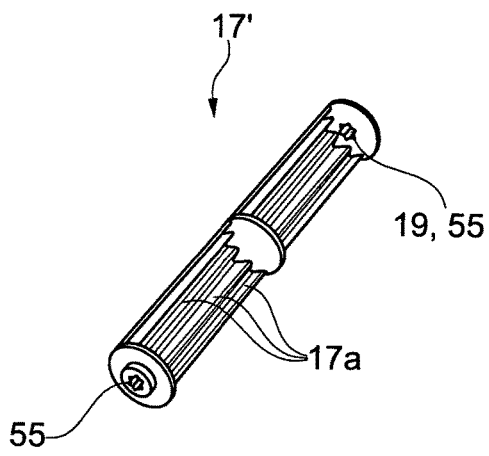
FIG. 23 shows an alternative version of the drum valve of the preheating unit.
Figure 25:
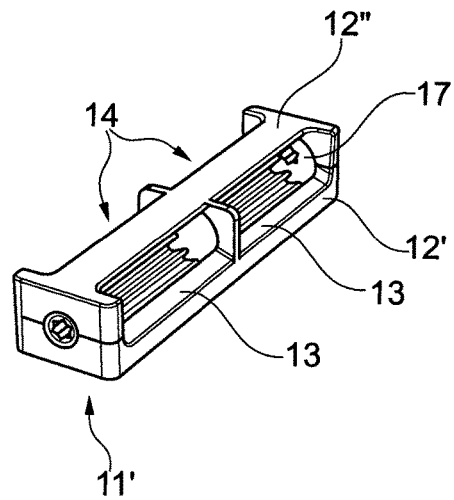
FIG. 25 shows an assembled alternative version of the preheating unit.
Figure 26:
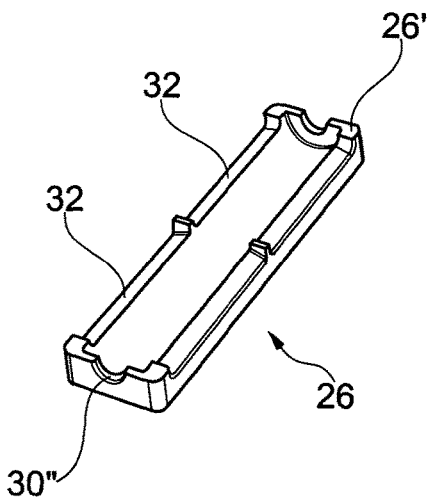
FIG. 26 shows the lower part of at chassis for an alternative version of the bypass unit.
Figure 28:
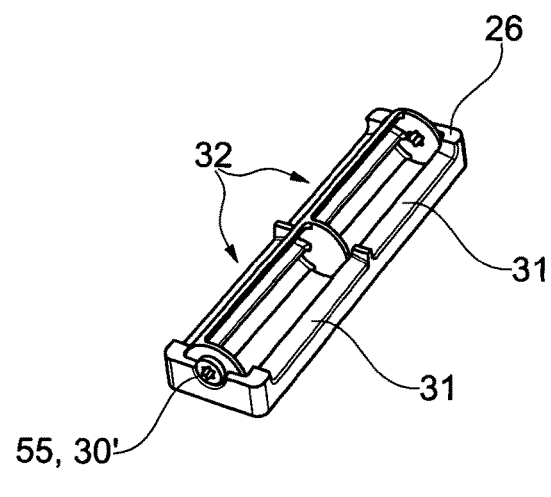
FIG. 28 shows the drum valve in the lower part of the chassis of the bypass unit.
Figure 27:
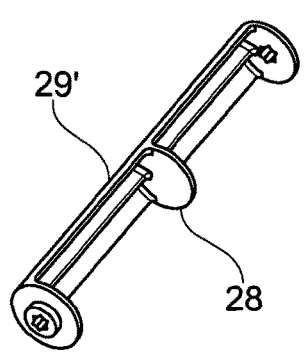
FIG. 27 shows an alternative version of the drum valve of the bypass unit.
Figure 29:
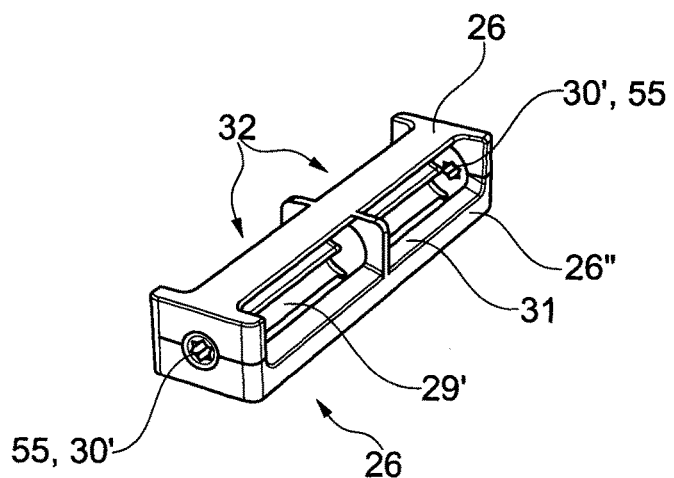
FIG. 29 shows an assembled alternative version of the bypass unit.

In FIGS. 22-25, the preheating unit comprises a lower 12' and an upper 12" chassis part and the first rotating throttle arranged in the chassis 12. As can be seen in FIG. 23, the interior surface of the drum shaped throttle 17 may be provided with ribs 17a, which reinforce the drum shaped wall and provide turbulence in the airflow inside the drum shaped throttle 17. If necessary, insulation strips can be arranged between the ribs for insulating and/or soundproofing the preheating unit 11. These details can also be provided in the variant of the first rotating throttle described above. It may be advantageous to provide a small opening in the preheating unit between the interior side and the air space, also called trickle vent position, as an alternative to a fully closed preheating unit. This allows for elimination of any condensing water between the window panes 3.

Figure 4:
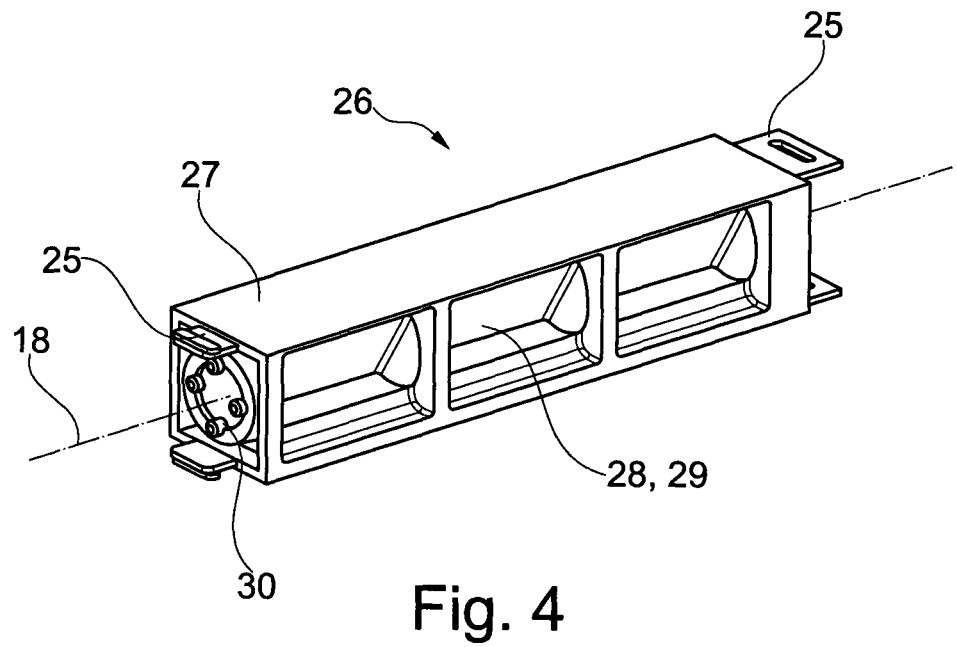
FIG. 4 shows a bypass unit.

FIG. 4 shows a bypass unit 26 comprising a second chassis 27 and a second rotatable throttle/bypass throttle 28. This second throttle 28 comprises a throttle plate 29 and means 30 for operating said second rotatable throttle 28. The means 30 seen in FIG. 4 actually correspond to the means 19 as seen in FIGS. 2 and 3.

Figure 5:
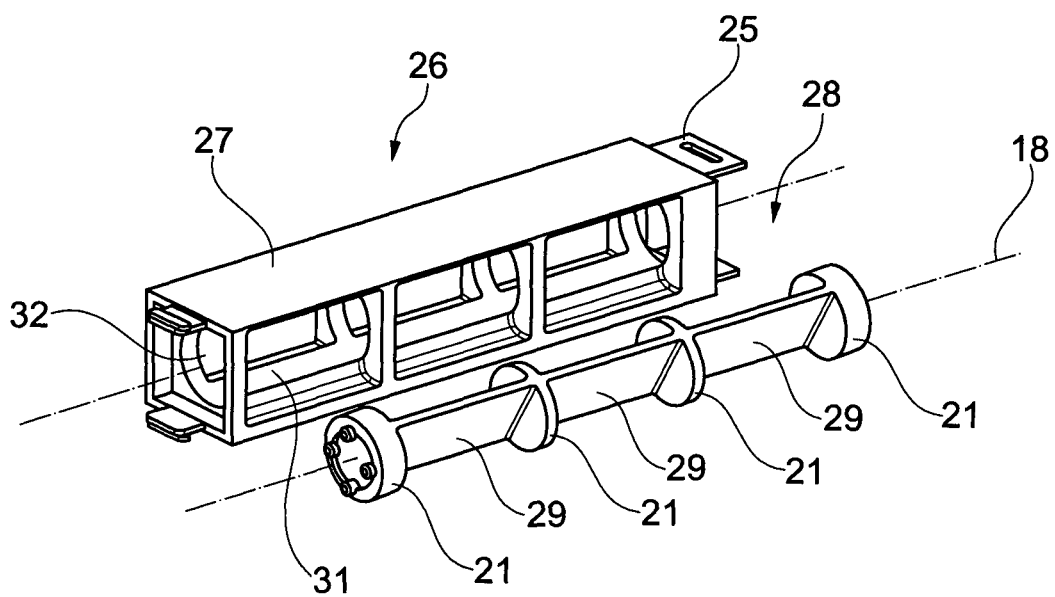
FIG. 5 shows a bypass unit and a not installed second throttle.

FIG. 5 shows a bypass unit 26 with a second chassis 27 and a not installed second throttle 28. The second chassis 27 comprises a fourth chassis opening 31 and a fifth chassis opening 32. The second throttle 28 is actually a kind of butterfly valve element and comprises said throttle plate 29 which will allow a flow of air when rotated a certain degree.

FIGS. 26-29 show a bypass unit having a similar construction. The second chassis 26 comprises a lower and an upper part 26', 26".

Figure 20:
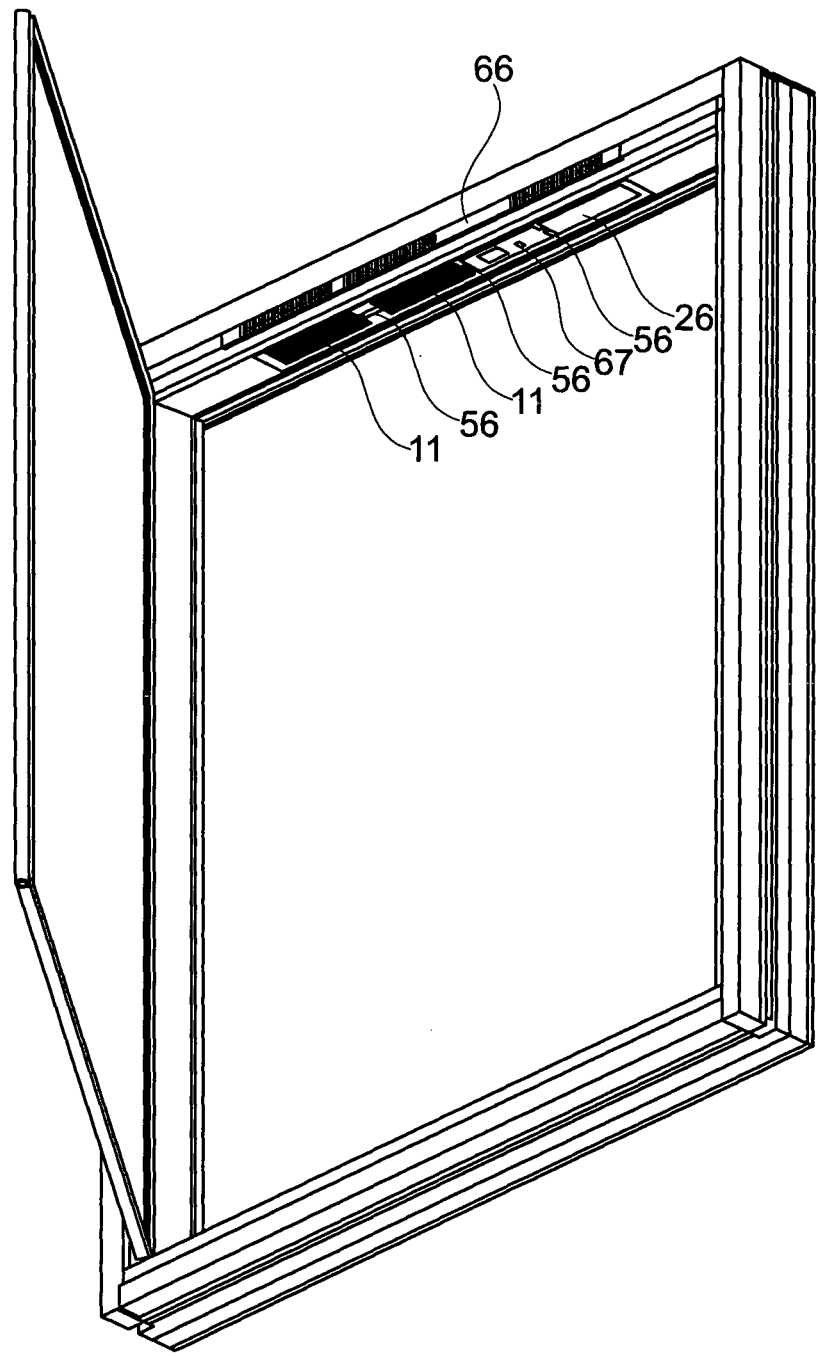
FIG. 20 shows the double window and the position of a drive unit, and preheating unit and bypass unit.

The first rotating throttle 17 in the preheating unit 11 and the second rotating throttle in the bypass unit 26 may comprise shaft connection means 55 (see, FIGS. 22-29) as an alternative to the snap connections 25 described above. Thus, at least one of the end surfaces, and preferably both end surfaces, of the drum shaped first 17 and second 28 throttle elements comprise a female connection part 55 for insertion of a shaft 56 (see, FIG. 20), such as a such as a square rod, a hexagonal rod or a shaft having a star-shaped cross section, i.e., TORX® shape. The shaft 56 may be provided in the desired length for adjusting the position of the units 11, 26, 33 in relation to each other. One shaft 56 connects the preheating unit 11 to a drive unit 33 or a drive subunit in one end, and optionally, a second shaft 56 connects the opposite end of the preheating unit to another preheating unit. Similarly, a bypass unit is connected to a drive unit 33 or a subunit by a shaft 56, and optionally, to another bypass unit by shaft connections 55, 56.

Figure 6:
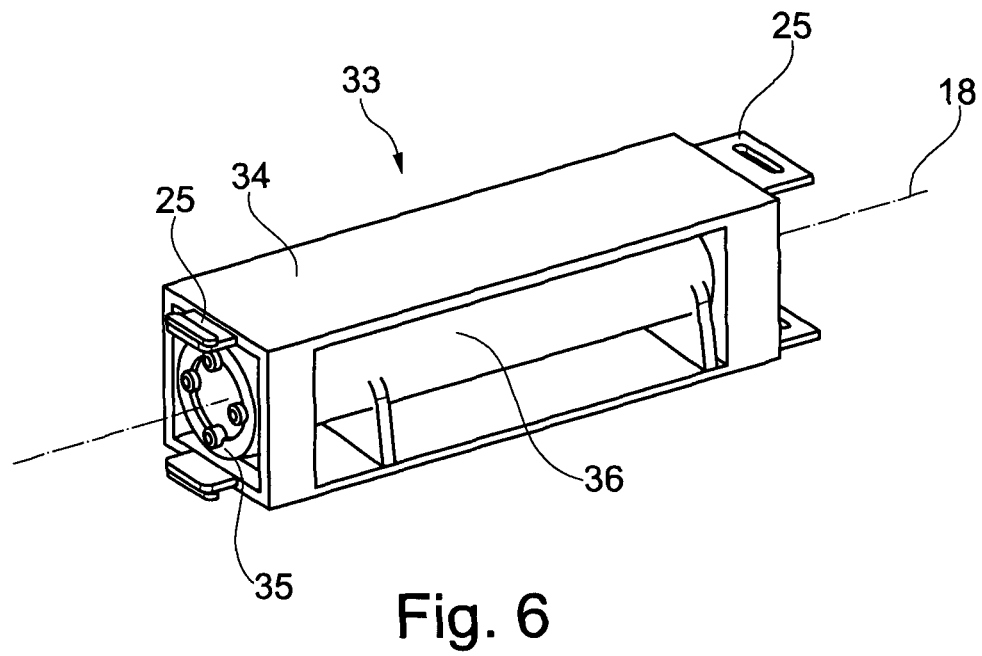
FIG. 6 shows a drive unit.

FIG. 6 shows a drive unit 33 comprising a third chassis 34 and at the end or ends of the third chassis 34 there is arranged means 35 for operating one or more units 11, 26 via corresponding means 19, 30 on said units 11, 26. Inside the third chassis 34, one or more actuators 36 is arranged to perform a rotational movement of the means 35. Such an actuator 36 can e.g., be an electric actuator or a thermo hydraulic actuator (also called thermo actuator) or any other suitable kid of actuator that can be arranged to perform a rotational movement of said means 35.

The drive unit 33 preferably contains two separate drive units: a first drive subunit 53 for controlling rotation of the first rotating throttle 17 in the preheating unit(s) 11 and a second drive subunit 54 for controlling rotation of the second throttle 29 in the bypass unit(s) 26.

Figure 30:
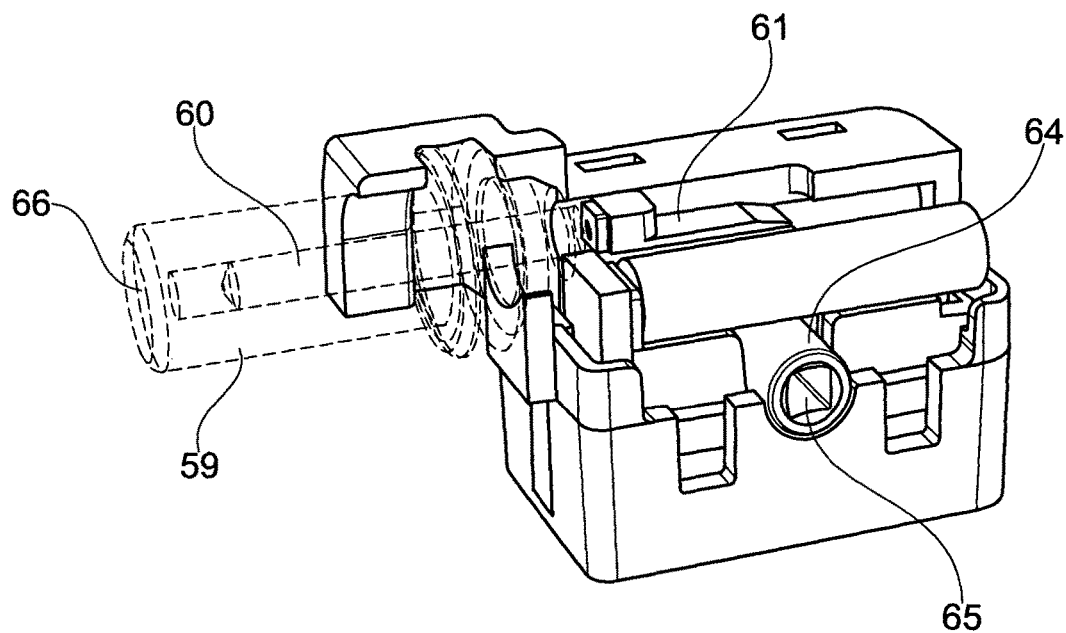
FIG. 30 shows an actuator part for the bypass unit which is part of an embodiment of the drive unit.
Figure 31:
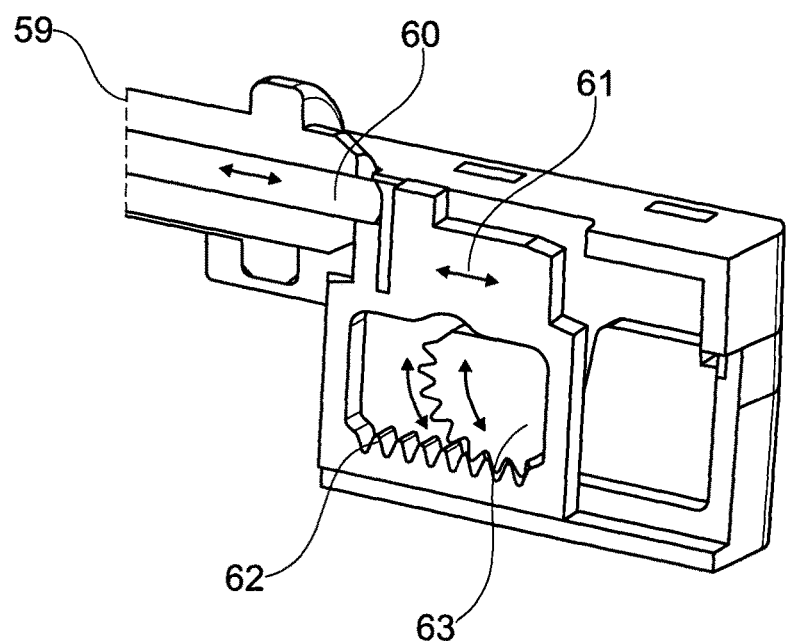
FIG. 31 shows a cross section of the bypass drive of the drive unit

FIGS. 30-31 show an embodiment of a second drive subunit 54, which is preferably used in the ventilation system as drive subunit for the bypass unit(s) 26. The drive unit comprises a thermo hydraulic actuator 59, in short, also called bypass thermo actuator, having a piston 60, which is actuated by a substance, e.g., wax, which expands when heated and contracts when cooled. When the temperature of the surrounding the thermo actuator increases, piston 60 pushes a frame 61 with toothed connection means 62. The toothed connection means engage with a toothed cam 63, which is mounted on a rotating shaft 64. The rotating shaft 64 is mounted perpendicular to the travelling direction of the piston 60, and thus, the longitudinal axis of the bypass thermo actuator 59. When the drive unit is arranged in the frame of the window, so that the bypass thermal actuator 59 is positioned with an end surface 66 in the exterior surface of the frame (see, FIG. 20), it is possible to control the bypass unit in response to the exterior temperature as described above.

Figure 32:
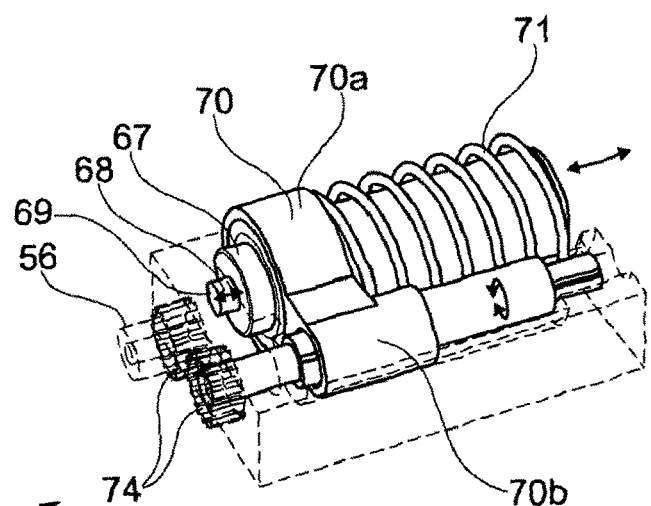
FIG. 32 shows a drive subunit for the preheating unit which is part of an embodiment of the drive unit when not active.
Figure 33:
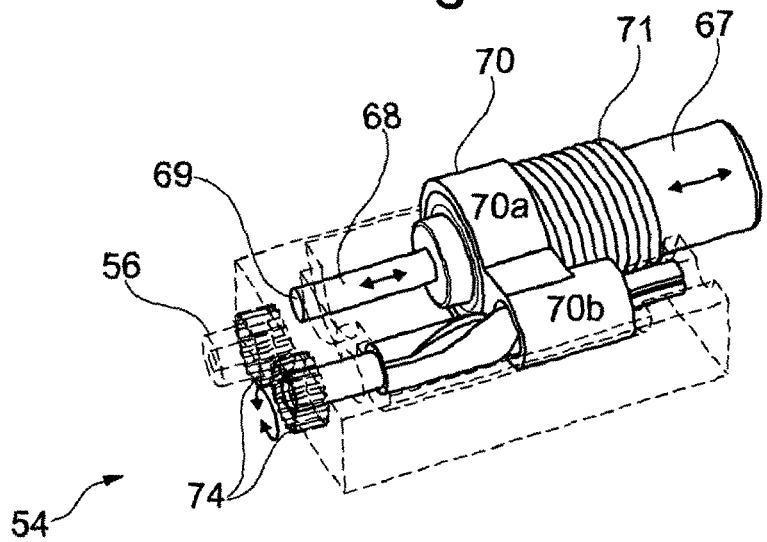
FIG. 33 shows the preheating unit actuator when fully activating the preheating unit.
Figure 34:
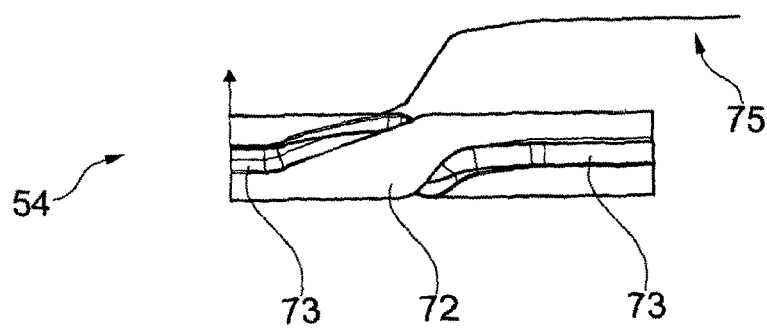
FIG. 34 shows the grooved shaft of a drive subunit for the preheating unit

FIGS. 32-33 show a possible construction of a drive subunit 53, in particular for the preheating unit 11. The preheating drive subunit 53 comprises a second thermal actuator 67 having a piston 68 similar to the bypass thermal actuator 59. The second thermal actuator 67 is arranged in the drive unit so that the external end of the piston 68 is in contact with a stop surface 69. A first cylindrical part 70a of the slider cup 70 is press fitted around the body of the second thermal actuator 67 and secured by a return spring 70. A second cylindrical part 70b of the slider cup 70 is arranged around a grooved rotating shaft 72. Inside the second cylindrical part of the slider cup, one or more pins (not shown) are arranged for engaging with a corresponding number of grooves 73 provided in the rotating shaft 72. The rotating shaft is connected to a shaft connection 55 of the preheating unit 11 via gears 74. The second thermal actuator 67 is placed so that it detects the temperature in the air space 8 (see, FIG. 20). When the temperature rises, the piston 68 pushes against the stop 69, which causes the entire second thermal actuator 67 and the slider cup 70 to move in the opposite direction as indicated by the arrows in FIG. 32. The slider cup pins of arranged in the grooves 73 on the grooved rotating shaft 72 causes the grooved shaft 72 to rotate, which results in a rotation of the gears 74 and thereby of the rotating throttle 17 in the preheating unit 11. The curve on the grooves in the rotating shaft 72 controls the effective rotation of the rotating shaft 72 as indicated in FIG. 34, where the planar curve 75 indicates the increase in rotation speed in relation to the shape of the grooves 73.

Figure 21:
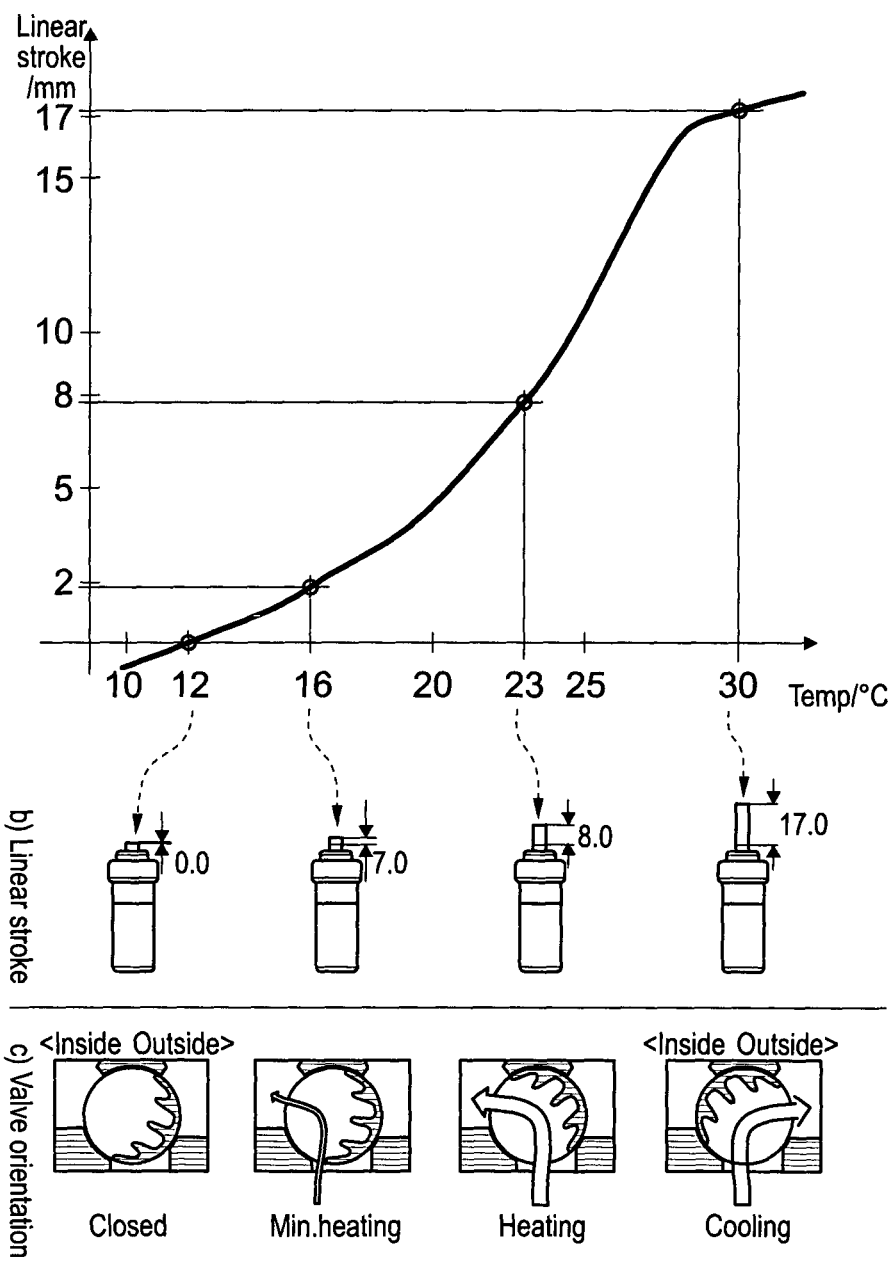
FIG. 21 shows a graph illustrating the position of an actuator, the preheating unit and the temperature between the window panes and the position of an actuator of a bypass unit, of the bypass unit and the exterior (outdoor) temperature.
Figure 22:
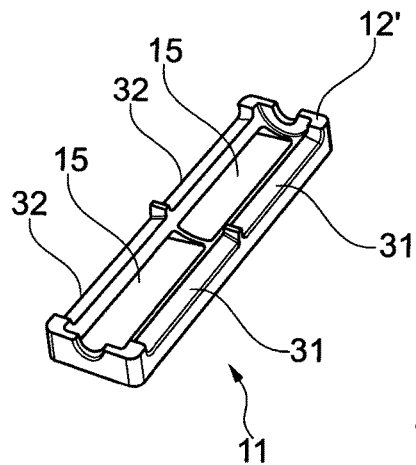
FIG. 22 shows the lower part of at chassis for an alternative version of the preheating unit.
Figure 24:
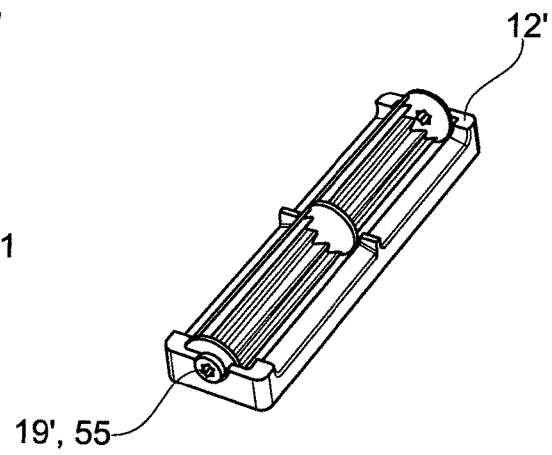
FIG. 24 shows the drum valve in the lower part of the chassis of the preheating unit.

The top part of FIG. 21 indicates the relationship between the temperature in the air space 8, the linear stroke of the second actuator 67 and the position of the first rotating throttle 17 in the preheating unit 11. Thus when the temperature in the air apace increases due to the sunlight heating the air in the air space 8 between the window panes 3, the linear stroke of the second actuator 67 increases, and the more the first rotating throttle 17 is rotated, as described above. The opposite occurs when the temperature of the air in the air space 8 decreases, e.g., during the night.

Part b of FIG. 21 indicates the relationship between the outdoor temperature, the linear stroke of the first actuator 59 and the position of the first rotating throttle 29 in the preheating unit 26. Thus, when the outdoor temperature increases, the linear stroke of the first actuator 59 increases and the more the second rotating throttle 29 is rotated, as described above. The opposite occurs when the outdoor temperature decreases, e.g., during the night.

In certain situations, it may be necessary to override the automatic control performed by the thermal actuators 59, 67. This can be performed by arranging a heating coil (not shown) around each of the thermal actuators 59, 67, which is connected to a power unit (not shown), e.g., a battery, and a control unit (not shown), which then can be forced to activate the throttles 17, 29 of the preheating unit and/or the bypass unit so that the preheating unit 11 and/or the bypass unit 26 is forced to open or close.

Figure 7:
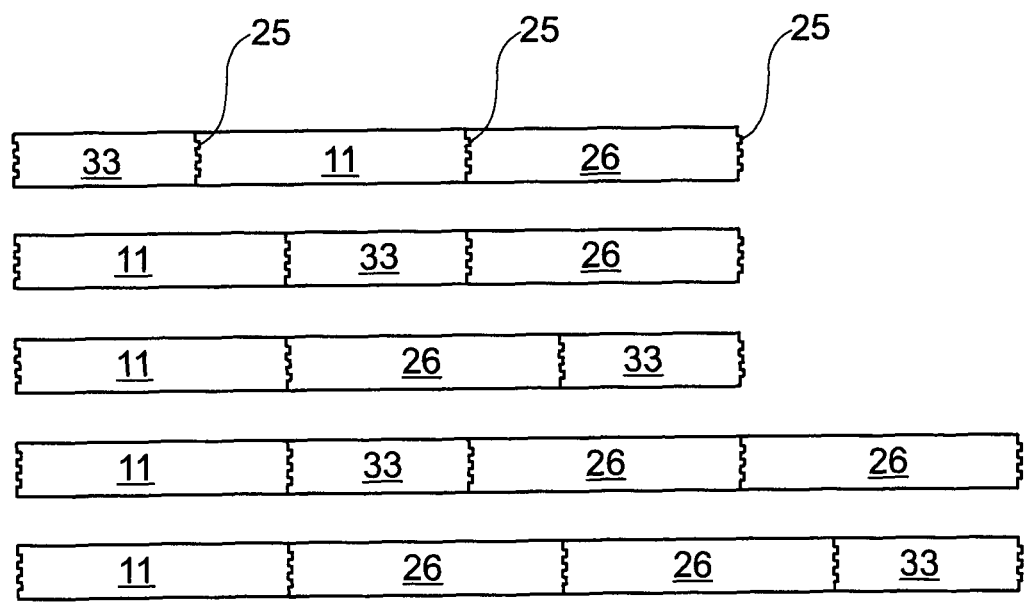
FIG. 7 shows combinations of preheating, bypass and drive units.

FIG. 7 shows combinations of preheating units 11, bypass units 26 and drive units 33. As can be seen, the various units 11, 26, 33 can be arranged in many different positions in relation to each other as they couple with connection means 25 at the ends.

FIGS. 8, 9, 10, 11, 12 show a cross section of a preheating unit 11 and a bypass unit 26 in a number of situations. Further, the surface of the first rotatable throttle 17 is seen in an unfolded manner in order to illustrate both the first 13, the second 14 and the third 15 chassis openings and also the first 20 and the second 24 throttle openings as these openings is seen unfolded in relation to each other.

In the cross sections of the preheating unit 11, the first 37, second 38 and the third 39 intermediate areas on the first chassis 12 are seen. Said areas 37, 38, 39 can also be called seat areas as they also work as seats for the first throttle 17. The extension/size of the intermediate areas 37, 38, 39 and the openings 20, 24 in the rotatable throttle 17 are very carefully designed to be able to adjust the area allowing air be supplied to either the exterior 6 or the interior 7. The same goes for the bypass unit 26 that comprises a fourth 40 and a fifth 41 intermediate area, also working as seats and closing areas between the second chassis 27 and the second rotatable throttle 28. In a bypass unit 26 the extension/size of the intermediate areas 40, 41 is also designed to work in relation with the actual rotation of both of the rotatable throttles 17, 28 as will be seen in the following FIGS. 8 to 12.

Between the rotatable throttles 17, 28 and the intermediate areas 37, 38, 39, 40, 41, a sealing material 42 is arranged to prevent false air. The sealing material 42 can be a carpet like material having fibers extending from a carrier layer, where said fibers constitute the sealing as the fibers deflect and adjust according to the throttle 17, 28 being present or not. The sealing material 42 is here seen on the chassis 12, 27 but can also be arranged on the throttle 17, 28 or on both parts.

The first chassis opening 13 being denoted by a first arrow 13, the second chassis opening 14 being denoted by a second arrow 14 and the third chassis opening 15 being denoted by a third arrow 15.

Figure 8:
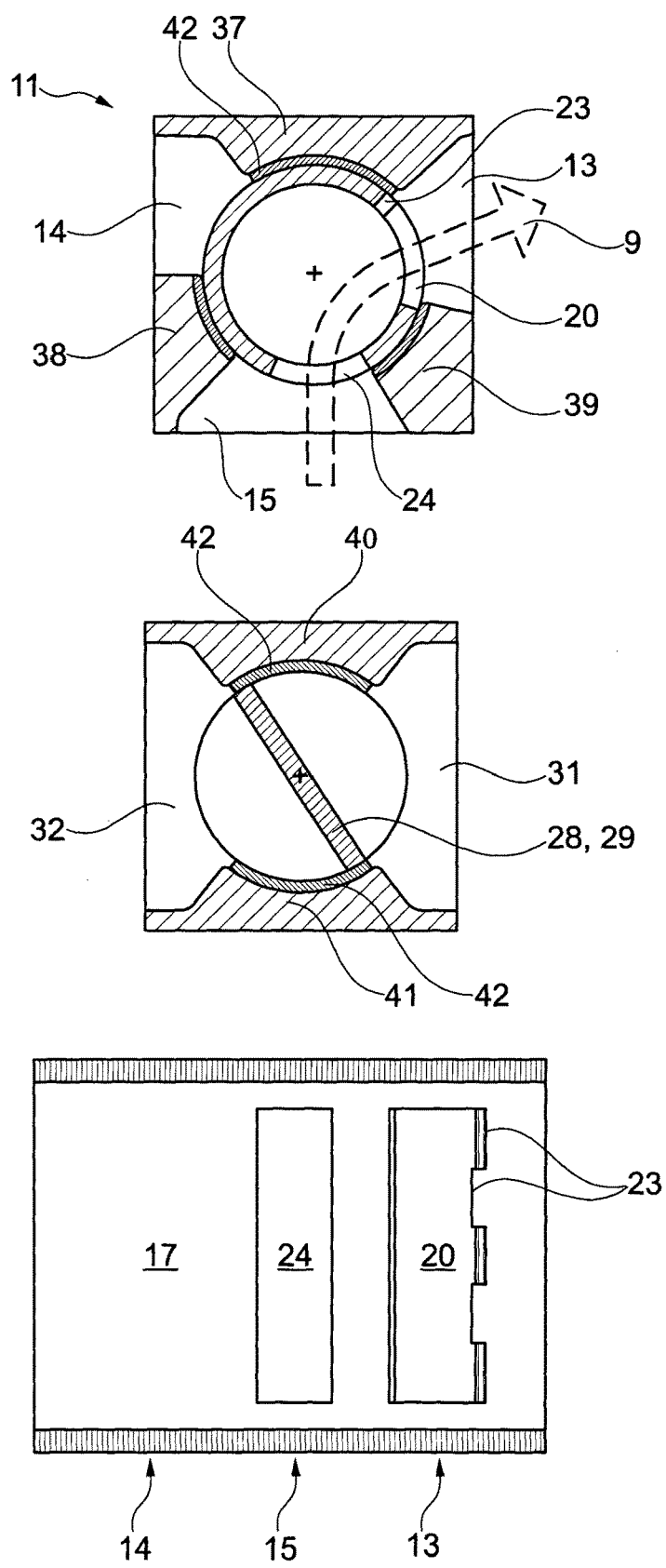
FIG. 8 shows a cross section of a preheating and a bypass unit in a first situation.

FIG. 8 shows a preheating unit 11 with a first throttle 17 where the first 20 and second 24 throttle opening is in a full open position guiding air 9 into the interior 7 while the bypass unit 26 is closed. This position can be used as a reference stating a 0 degree rotation of the throttle 17, 28. In this embodiment of the invention, the longitudinal edge 23 of the first opening 20 in the first throttle 17 is designed with a non-linear design as also mentioned above. This design is only an example as the edge 23 can have various shapes and designs according to specific needs and thus also can be linear.

Figure 9:
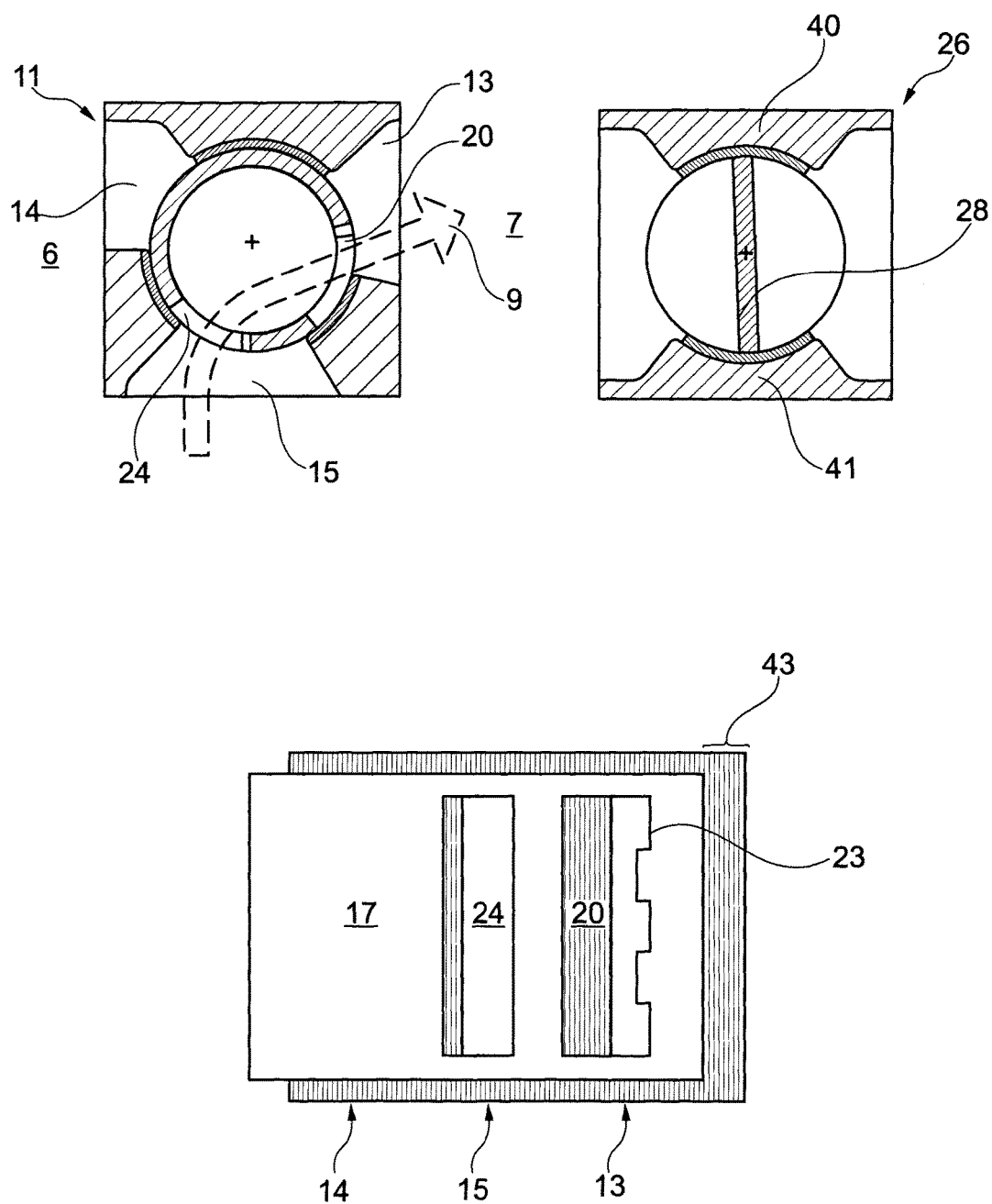
FIG. 9 shows a cross section of a preheating and a bypass unit in a second situation.

FIG. 9 shows a preheating unit 11 with a first throttle 17 where the first 20 and second 24 throttle opening has been closed partly, and thus, only 50% of the possible area is open to guide air 9 into the interior 7 while the bypass unit 26 still is closed as the bypass throttle 28 still is in contact with the fourth 40 and fifth 41 intermediate area. The throttles 17, 28 have been operated with a degree of rotation 43 that equals 33.3 degrees in the clockwise direction since the situation in FIG. 8.

Figure 10:
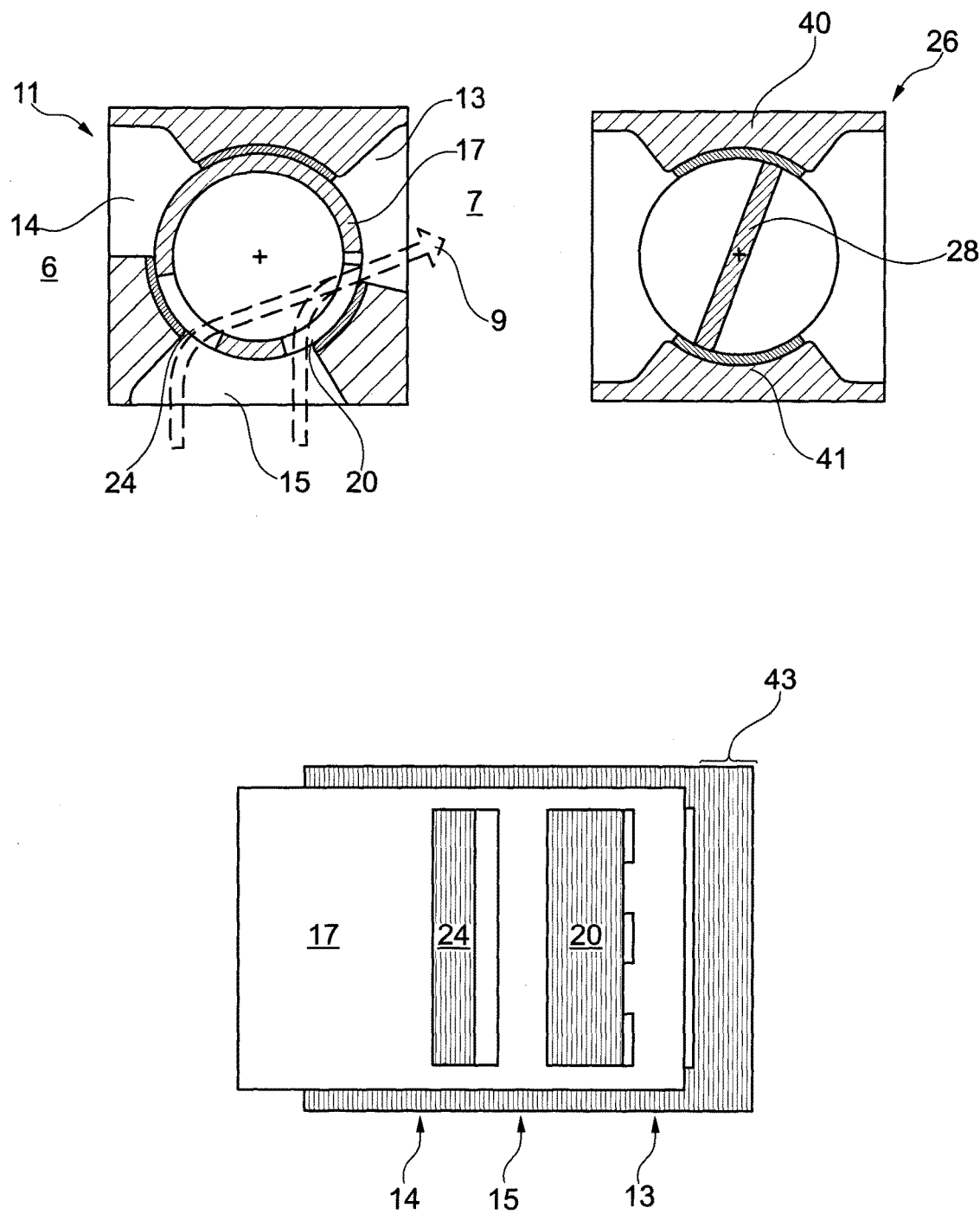
FIG. 10 shows a cross section of a preheating and a bypass unit in a third situation.

FIG. 10 shows a preheating unit 11 with a first throttle 17 where the first 20 and second 24 throttle opening has been nearly closed, and thus, only 10% of the possible area is open to guide air 9 into the interior 7 while the bypass unit 26 still is closed as the bypass throttle 28 still is in contact with the fourth 40 and fifth 41 intermediate area. In this situation the non-linear edge 23 of the first throttle opening 20 is minimizing the area open towards the interior. The design of the non-linear edge 23 allows for only 60% of the "nominal" flow during the first/last few degrees of rotation. The shape/design of the non-linear edge 23 can be made in a number of ways. It can e.g., be helical, or it can e.g., have teeth with a triangular or any other shape. The throttles 17, 28 have been operated a degree of rotation 43 that equals 54.6 degrees in the clockwise direction since the situation in FIG. 8 and the first throttle opening 20 is now partly open towards the first chassis opening 13 and partly towards the third chassis opening 15.

Figure 11:
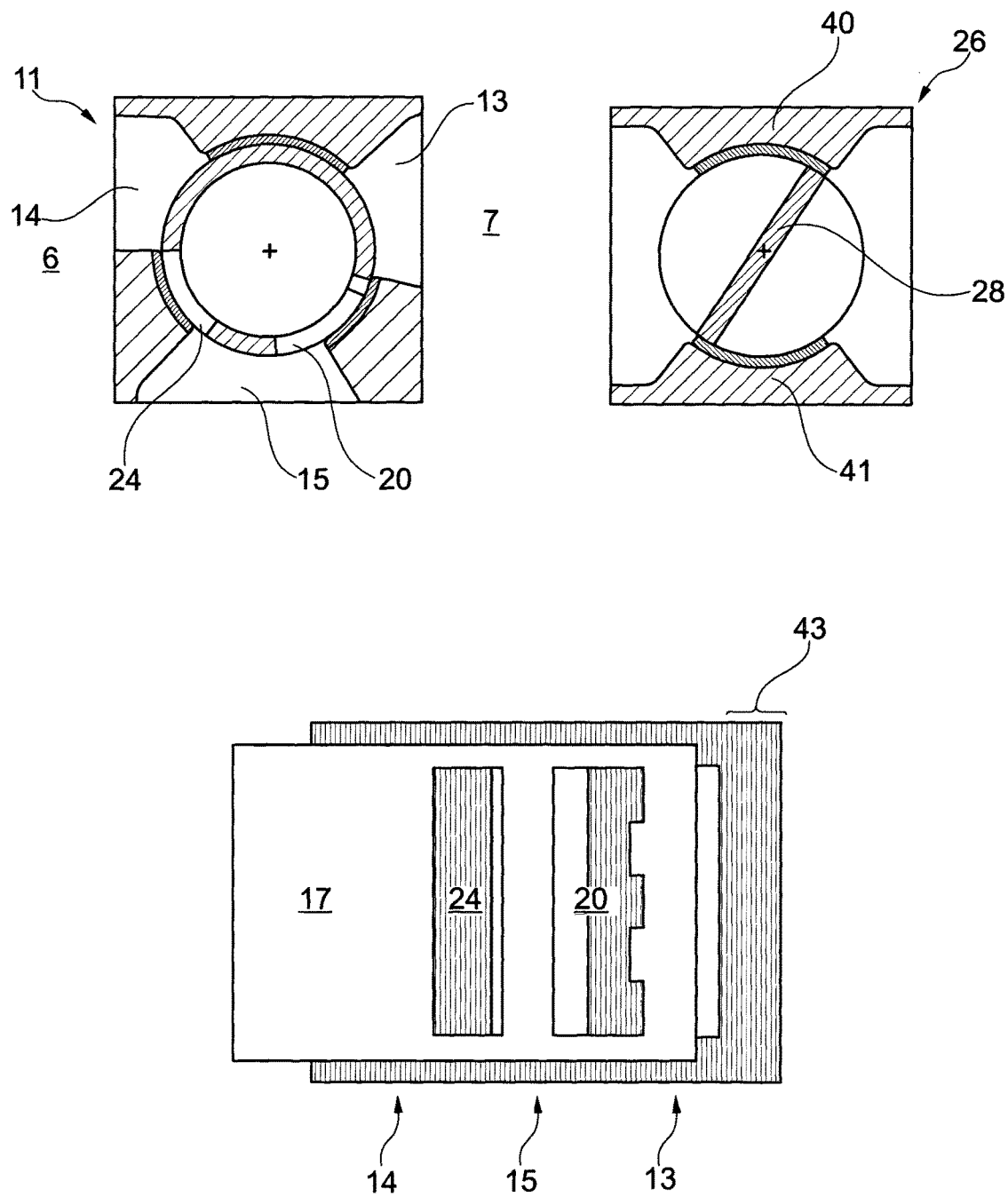
FIG. 11 shows a cross section of a preheating and a bypass unit in a fourth situation.

FIG. 11 shows a preheating unit 11 with a first throttle 17 where the first 20 and second 24 throttle opening has been closed, and thus, 0% of the possible area is open to guide air 9 into the interior 7 and also the bypass unit 26 is still closed as the bypass throttle 28 still is in contact with the fourth 40 and fifth 41 intermediate area. The throttles 17, 28 have been operated a degree of rotation 43 that equals 65 degrees in the clockwise direction from the situation in FIG. 8.

Figure 12:
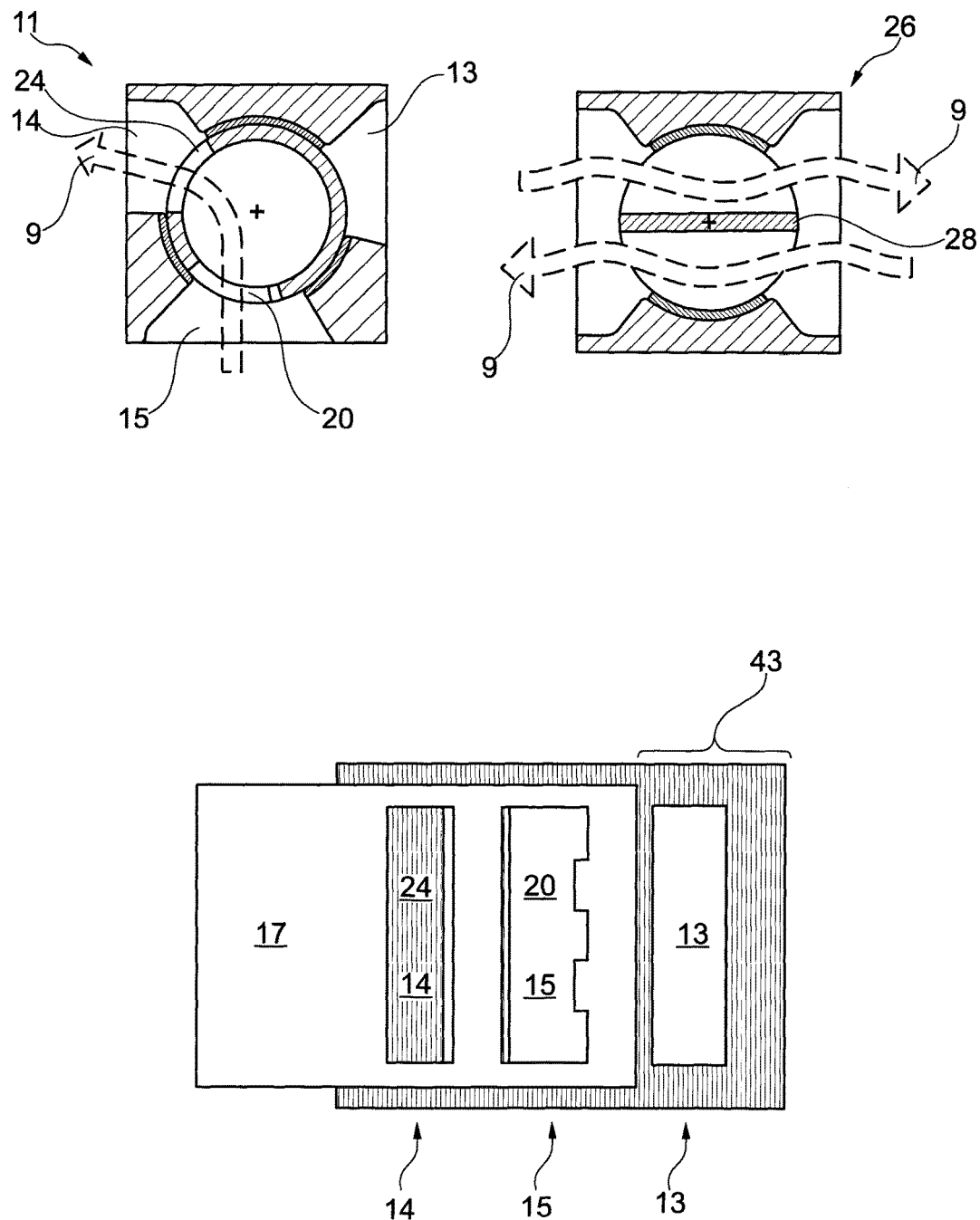
FIG. 12 shows a cross section of a preheating and a bypass unit in a fifth situation.

FIG. 12 shows a preheating unit 11 with a first throttle 17 where the first 20 and second 24 throttle opening has been 100% opened towards the exterior 6 in order to guide air 9 into the exterior 6 and also the bypass unit 26 is now 100% open as the bypass throttle 28 is in the mid position between the fourth 40 and fifth 41 intermediate area. The throttles 17, 28 have been operated a degree of rotation 43 that equals 120 degrees in the clockwise direction since the situation in FIG. 8 and the first throttle opening 20 now serves as a control valve in the third chassis opening 15 and the second throttle opening 24 now serves as a control valve in the second chassis opening 14.

Figure 13:
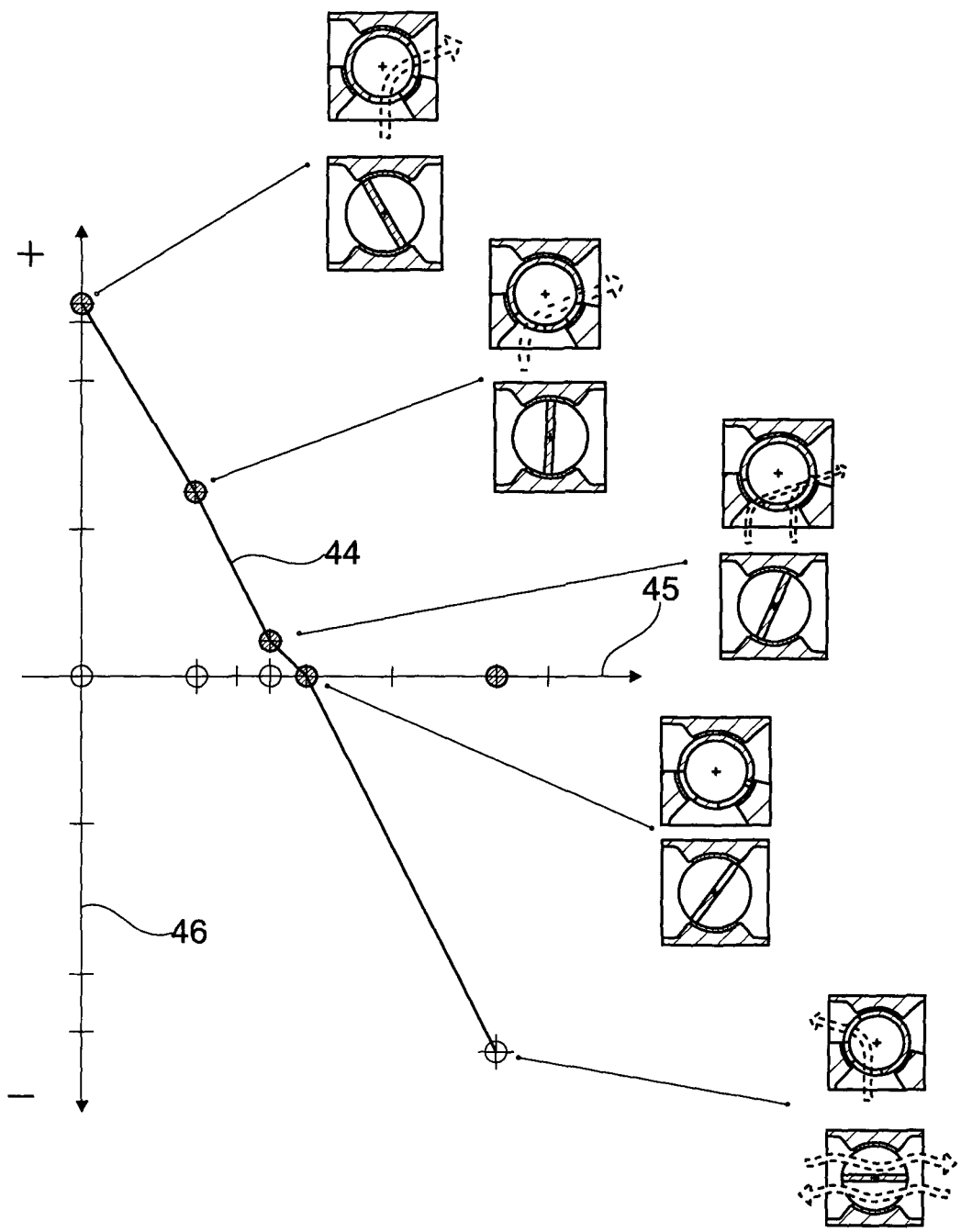
FIG. 13 shows a graph over ventilation area as a function of degree of throttle rotation.

FIG. 13 shows a graph 44 of the ventilation area as a function of degree of throttle rotation as also seen in FIGS. 8 to 12. On the X-axis 45, the degree of rotation of the two throttles 17, 28 is seen from 0 to 120 degrees. On the Y-axis 46, the area in square millimeters is seen for a preheating unit 11 having a length of 150 millimeters. On the positive part of the Y-axis 46, the area allowing for a preheating is seen, meaning that air is guided between the panes of glass 3 and into the interior 7. On the negative part of the Y-axis 46, the area allowing for a cooling or ventilation is seen, meaning that air is guided between the panes of glass 3 and back into the exterior 6.

What is claimed is:

1. A ventilation device for ventilating an interior room in a building, said building comprising a window, said window comprising at least two essentially parallel panes of glass, said at least two panes of glass being arranged in one of: a common frame, at least two juxtaposed frames, thus forming said window, where said at least two panes of glass are arranged with a distance between them creating an air space between said panes of glass, said window further comprising an intake opening communicating with said air space and with one of: the interior and the exterior of said building, where said ventilation device is constructed for being arranged in the common frame or juxtaposed frames and in communication with the air space, the interior room and the exterior environment, and wherein said ventilation device further comprises a modular system having a number of separate units that are combined into the ventilation device, said ventilation device further comprising a single drive unit, and at least one preheating unit, comprising a first chassis and a first rotatable throttle, where said first chassis comprises a first opening communicating with the interior of said building, a second opening communicating with the exterior of said building and a third opening communicating with said air space, and where said at least one preheating unit is arranged in said frame whereby said first rotatable throttle comprises a central longitudinal rotation axis, and said at least one preheating unit further comprises rotating means for rotating said first rotatable throttle about said central longitudinal rotation axis, wherein said first rotatable throttle and said first chassis comprises snap connection means for connection with corresponding snap connection means arranged on at least one of the drive units or one or more further modular units of the ventilation device in a longitudinal direction, wherein said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed and an open position, further said second chassis comprises a fourth opening communicating with the interior of said building, and a fifth opening communicating with the exterior of said building, and wherein said drive unit is a modular drive unit, where said drive unit is arranged in said frame and where said drive unit comprises a third chassis and where the drive unit is provided with means for rotating at least one of said first and second rotatable throttle about the central longitudinal axis thereof between a closed position and an open position, and where said drive unit comprises at least one actuator, and where the snap connection means are provided for connecting the actuator to at least one of said first and second rotatable throttles.

2. A ventilation device according to claim 1, wherein said modular units comprises axial connection means for connection of the drive unit to another modular unit by a connecting shaft.

3. A ventilation device according to claim 1, wherein said rotatable throttle in said bypass unit comprises a throttle plate, and said bypass unit comprises a fourth opening communicating with the interior and a fifth opening communicating with the exterior of said building.

4. A ventilation device according to claim 1, wherein at least one of said preheating unit and bypass unit comprises a rotatable throttle, and further comprises a sealing material arranged between a throttle and a seat area inside at least one of said first and second chassis.

5. A ventilation device according to claim 1, wherein said ventilation device comprises an insulating jacket, for one or more individual modular units.

6. A ventilation device according to claim 1, wherein said first rotatable throttle in said preheating unit is a hollow throttle member comprising at least one first throttle opening for communication with the first and the third chassis opening, said first throttle opening having a first area.

7. A ventilation device according to claim 6, wherein said hollow throttle member further comprises a second throttle opening for communication with the second and the third chassis opening, said second throttle opening having a second area.

8. A ventilation device according to claim 6, wherein said preheating unit comprises a first intermediate area between the first and second chassis opening, a second intermediate area between the second and third chassis opening, and a third intermediate area between the third and first throttle opening, where said intermediate areas serve partly as a bearing surface for the rotatable first throttle and partly as a blocking surface for at least one of the first and second throttle openings.

9. A ventilation device according to claim 6, wherein said preheating unit comprises a longitudinal edge of at least one of the first chassis opening and the first throttle opening, where said longitudinal edge is not-linear.

10. A ventilation device for ventilating an interior room in a building, said building comprising a window, said window comprising at least two essentially parallel panes of glass, said at least two panes of glass being arranged in one of: a common frame, at least two juxtaposed frames, thus forming said window, where said at least two panes of glass are arranged with a distance between them creating an air space between said panes of glass, said window further comprising an intake opening communicating with said air space and with one of: the interior and the exterior of said building, where said ventilation device is constructed for being arranged in the common frame or juxtaposed frames and in communication with the air space, the interior room and the exterior environment, and wherein said ventilation device further comprises a modular system having a number of separate units that are combined into the ventilation device, said ventilation device further comprising a single drive unit, and at least one preheating unit comprising a first chassis and a first rotatable throttle, where said first chassis comprises a first opening communicating with the interior of said building, a second opening communicating with the exterior of said building and a third opening communicating with said air space, and where said at least one preheating unit is arranged in said frame whereby said first rotatable throttle comprises a central longitudinal rotation axis, and said at least one preheating unit further comprises rotating means for rotating said first rotatable throttle about said central longitudinal rotation axis, wherein said first rotatable throttle and one of said first chassis comprises snap connection means for connection with corresponding snap connection means arranged on at least one of the drive units or one or more further modular units of the ventilation device in a longitudinal direction, wherein said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed and an open position, further said second chassis comprises a fourth opening communicating with the interior of said building, and a fifth opening communicating with the exterior of said building, wherein said drive unit is a modular drive unit, where said drive unit is arranged in said frame and where said drive unit comprises a third chassis and where the drive unit is provided with means for rotating at least one of said first and second rotatable throttle about the central longitudinal axis thereof between a closed position and an open position, and where said drive unit comprises at least one actuator, and where the snap connection means are provided for connecting the actuator to at least one of said first and second rotatable throttles, and wherein said drive unit comprises a first drive subunit connected to said first rotatable throttle and being connectable thereto for rotating said first rotatable throttle about the central longitudinal axis thereof and a second drive subunit connected to said second rotatable throttle and for rotating second rotatable throttle about the central longitudinal axis thereof, and wherein at least one of the first and second drive subunits are actuated by at least one thermal actuator.

11. A ventilation device for ventilating an interior room in a building, said building comprising a window, said window comprising at least two essentially parallel panes of glass, said at least two panes of glass being arranged in one of: a common frame, at least two juxtaposed frames, thus forming said window, where said at least two panes of glass are arranged with a distance between them creating an air space between said panes of glass, said window further comprising an intake opening communicating with said air space and with one of: the interior and the exterior of said building, where said ventilation device is constructed for being arranged in the common frame or juxtaposed frames and in communication with the air space, the interior room and the exterior environment, and wherein said ventilation device further comprises a modular system having a number of separate units that are combined into the ventilation device, said ventilation device further comprising a single drive unit, and at least one preheating unit comprising a first chassis and a first rotatable throttle, where said first chassis comprises a first opening communicating with the interior of said building, a second opening communicating with the exterior of said building and a third opening communicating with said air space, and where said at least one preheating unit is arranged in said frame whereby said first rotatable throttle comprises a central longitudinal rotation axis, and said at least one preheating unit further comprises rotating means for rotating said first rotatable throttle about said central longitudinal rotation axis, wherein said first rotatable throttle and said first chassis comprises snap connection means for connection with corresponding snap connection means arranged on at least one of the drive units or one or more further modular units of the ventilation device in a longitudinal direction, wherein said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed position and an open position, further said second chassis comprises a fourth opening communicating with the interior of said building, and a fifth opening communicating with the exterior of said building, wherein said drive unit is a modular drive unit, where said drive unit is arranged in said frame and where said drive unit comprises a third chassis and where the drive unit is provided with means for rotating at least one of said first and second rotatable throttle about the central longitudinal axis thereof between a closed position and an open position, and where said drive unit comprises at least one actuator, and where the snap connection means are provided for connecting the actuator to at least one of said first and second rotatable throttles, and, wherein said modular units comprises connection means for connection of one modular unit to another modular unit, where said connection means comprises at least one snap action mechanism, where said at least one snap action mechanism is arranged on at least one end of the first, second and third chassis and where a corresponding snap action means are is arranged on at least one end of another of the first, second and third chassis.

12. A ventilation device for ventilating an interior room in a building, said building comprising a window, said window comprising at least two essentially parallel panes of glass, said at least two panes of glass being arranged in one of: a common frame, at least two juxtaposed frames, thus forming said window, where said at least two panes of glass are arranged with a distance between them creating an air space between said panes of glass, said window further comprising an intake opening communicating with said air space and with one of: the interior and the exterior of said building, where said ventilation device is constructed for being arranged in the common frame or juxtaposed frames and in communication with the air space, the interior room and the exterior environment, and wherein said ventilation device further comprises a modular system having a number of separate units that are combined into the ventilation device, said ventilation device further comprising a single drive unit, and at least one preheating unit comprising a first chassis and a first rotatable throttle, where said first chassis comprises a first opening communicating with the interior of said building, a second opening communicating with the exterior of said building and a third opening communicating with said air space, and where said at least one preheating unit is arranged in said frame whereby said first rotatable throttle comprises a central longitudinal rotation axis, and said at least one preheating unit further comprises rotating means for rotating said first rotatable throttle about said central longitudinal rotation axis, wherein said first rotatable throttle and said first chassis comprises snap connection means for connection with corresponding snap connection means arranged on at least one of the drive units or one or more further modular units of the ventilation device in a longitudinal direction, wherein said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed and an open position, further said second chassis comprises a fourth opening communicating with the interior of said building, and a fifth opening communicating with the exterior of said building, wherein said drive unit is a modular drive unit, where said drive unit is arranged in said frame and where said drive unit comprises a third chassis and where the drive unit is provided with means for rotating at least one of said first and second rotatable throttle about the central longitudinal axis thereof between a closed position and an open position, and where said drive unit comprises at least one actuator, and where the snap connection means are provided for connecting the actuator to at least one of said first and second rotatable throttles, and wherein said modular units comprises connection means for connection of one modular unit to another modular unit, where said connection means comprises at least one snap action mechanism, where said at least one snap action mechanism is arranged on at least one of the first, second and third chassis, and on at least one of the first and second throttles.

13. A ventilation device for ventilating an interior room in a building, said building comprising a window, said window comprising at least two essentially parallel panes of glass, said at least two panes of glass being arranged in one of: a common frame, at least two juxtaposed frames, thus forming said window, where said at least two panes of glass are arranged with a distance between them creating an air space between said panes of glass, said window further comprising an intake opening communicating with said air space and with one of: the interior and the exterior of said building, where said ventilation device is constructed for being arranged in the common frame or juxtaposed frames and in communication with the air space, the interior room and the exterior environment, and wherein said ventilation device further comprises a modular system having a number of separate units that are combined into the ventilation device, said ventilation device further comprising a single drive unit, and at least one preheating unit comprising a first chassis and a first rotatable throttle, where said first chassis comprises a first opening communicating with the interior of said building, a second opening communicating with the exterior of said building and a third opening communicating with said air space, and where said at least one preheating unit is arranged in said frame whereby said first rotatable throttle comprises a central longitudinal rotation axis, and said at least one preheating unit further comprises rotating means for rotating said first rotatable throttle about said central longitudinal rotation axis, wherein said first rotatable throttle and said first chassis comprises snap connection means for connection with corresponding snap connection means arranged on at least one of the drive units or one or more further modular units of the ventilation device in a longitudinal direction, wherein said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed and an open position, further said second chassis comprises a fourth opening communicating with the interior of said building, and a fifth opening communicating with the exterior of said building, wherein said drive unit is a modular drive unit, where said drive unit is arranged in said frame and where said drive unit comprises a third chassis and where the drive unit is provided with means for rotating at least one of said first and second rotatable throttle about the central longitudinal axis thereof between a closed position and an open position, and where said drive unit comprises at least one actuator, and where the snap connection means are provided for connecting the actuator to at least one of said first and second rotatable throttles, and, wherein said ventilation device comprises control means for controlling and operating said drive unit, where said control means comprises at least one sensor.

14. A ventilation device for ventilating an interior room in a building, said building comprising a window, said window comprising at least two essentially parallel panes of glass, said at least two panes of glass being arranged in one of: a common frame, at least two juxtaposed frames, thus forming said window, where said at least two panes of glass are arranged with a distance between them creating an air space between said panes of glass, said window further comprising an intake opening communicating with said air space and with one of: the interior and the exterior of said building, where said ventilation device is constructed for being arranged in the common frame or juxtaposed frames and in communication with the air space, the interior room and the exterior environment, and wherein said ventilation device further comprises a modular system having a number of separate units that are combined into the ventilation device, said ventilation device further comprising a single drive unit, and at least one preheating unit comprising a first chassis and a first rotatable throttle, where said first chassis comprises a first opening communicating with the interior of said building, a second opening communicating with the exterior of said building and a third opening communicating with said air space, and where said at least one preheating unit is arranged in said frame whereby said first rotatable throttle comprises a central longitudinal rotation axis, and said at least one preheating unit further comprises rotating means for rotating said first rotatable throttle about said central longitudinal rotation axis, wherein said first rotatable throttle and said first chassis comprises snap connection means for connection with corresponding snap connection means arranged on at least one of the drive units or one or more further modular units of the ventilation device in a longitudinal direction, wherein said ventilation device further comprises a modular bypass unit, where said bypass unit is arranged in said frame and where said bypass unit comprises a second chassis and a second rotatable throttle, where said second rotatable throttle comprises a central longitudinal rotation axis, said bypass unit further comprises means for operating said second rotatable throttle between a closed and an open position, further said second chassis comprises a fourth opening communicating with the interior of said building, and a fifth opening communicating with the exterior of said building, wherein said drive unit is a modular drive unit, where said drive unit is arranged in said frame and where said drive unit comprises a third chassis and where the drive unit is provided with means for rotating at least one of said first and second rotatable throttle about the central longitudinal axis thereof between a closed position and an open position, and where said drive unit comprises at least one actuator, and where the snap connection means are provided for connecting the actuator to at least one of said first and second rotatable throttles, and, wherein said ventilation device comprises control means for controlling and operating said drive unit, where said control means comprises at least one of the following types of sensors; a temperature sensor, a humidity sensor, a $CO_2$ sensor, and an $O_2$ sensor.

\* \* \* \* \*